(12) United States Patent
Baek et al.

(10) Patent No.: US 10,231,087 B2
(45) Date of Patent: Mar. 12, 2019

(54) TERMINAL AND COMMUNICATION METHOD OF THE SAME

(71) Applicant: Samsung Electronics Co., Ltd, Gyeonggi-do (KR)

(72) Inventors: Youngkyo Baek, Seoul (KR); Sunghoon Kim, Gyeonggi-do (KR); Hoyeon Lee, Gyeonggi-do (KR); Sung Hwan Won, Seoul (KR); Songyean Cho, Seoul (KR); Erik Guttman, Waibstadt (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/231,663

(22) Filed: Aug. 8, 2016

(65) Prior Publication Data
US 2017/0041752 A1 Feb. 9, 2017

Related U.S. Application Data

(60) Provisional application No. 62/202,406, filed on Aug. 7, 2015.

(51) Int. Cl.
*H04W 4/02* (2018.01)
*H04L 29/08* (2006.01)
(Continued)

(52) U.S. Cl.
CPC ............ *H04W 4/023* (2013.01); *H04L 67/10* (2013.01); *H04W 4/06* (2013.01); *H04W 4/60* (2018.02);
(Continued)

(58) Field of Classification Search
CPC ........................................................ H04W 4/02
See application file for complete search history.

(56) References Cited

U.S. PATENT DOCUMENTS

| 8,750,179 B2 | 6/2014 | Purnadi et al. |
| 2005/0024553 A1 | 2/2005 | Fukuta et al. |

(Continued)

FOREIGN PATENT DOCUMENTS

| KR | 10-2015-0113777 | 10/2015 |
| WO | 2010026287 A1 | 3/2010 |

(Continued)

OTHER PUBLICATIONS

3GPP TR 23.713, V1.5.0, "3rd Generation Partnership Project; Technical Specification Group Services and Systems Aspects; Study on Extended Architecture Support for Proximity-Based Services," (Release 13), Jul. 28, 2015, 81 pages, publisher 3GPP Organizational Partners (ARIB, ATIS, CCSA, ETSI, TIA, TTC).

(Continued)

*Primary Examiner* — Michael T Vu

(57) ABSTRACT

The present invention relates to a terminal and a communication method of the same. According to an embodiment of the present invention, a communication method of a remote terminal may include: transmitting, to a relay terminal, a request message comprising ProSe (proximity based service) per-packet priority associated with a TMGI (temporary mobile group identity); and receiving, from the relay terminal, a MBMS traffic transmitted based on the ProSe per-packet priority.

16 Claims, 26 Drawing Sheets

(51) Int. Cl.
*H04W 4/06* (2009.01)
*H04W 4/60* (2018.01)
*H04W 76/40* (2018.01)
*H04W 8/00* (2009.01)
*H04W 88/04* (2009.01)

(52) U.S. Cl.
CPC ............ *H04W 76/40* (2018.02); *H04W 8/005* (2013.01); *H04W 88/04* (2013.01)

(56) References Cited

U.S. PATENT DOCUMENTS

| | | |
|---|---|---|
| 2012/0327947 A1 | 12/2012 | Cai et al. |
| 2013/0044668 A1 | 2/2013 | Purnadi et al. |
| 2014/0016537 A1 | 1/2014 | Khobare et al. |
| 2015/0029866 A1 | 1/2015 | Liao et al. |
| 2016/0050601 A1 | 2/2016 | Jeong et al. |
| 2016/0204847 A1 | 7/2016 | Ryu et al. |
| 2016/0227385 A1 | 8/2016 | Ahmad et al. |
| 2016/0344726 A1* | 11/2016 | Stojanovski .......... H04W 76/14 |
| 2016/0381491 A1* | 12/2016 | Watfa .................... H04W 76/14 455/41.2 |
| 2017/0164332 A1* | 6/2017 | Kim ...................... H04W 72/02 |

FOREIGN PATENT DOCUMENTS

| | | |
|---|---|---|
| WO | 2015026111 A1 | 2/2015 |
| WO | 2015038438 A1 | 3/2015 |
| WO | 2015119427 A1 | 8/2015 |
| WO | WO 2016/072814 A1 | 5/2016 |

OTHER PUBLICATIONS

LG Electronics, "Clarification on TMGI Advertisement Procedure and Resolving the Related FFS," SA WG2 Meeting #109, S2-151612, Fukuoka, Japan, May 25-29, 2015, 7 pages.

Qualcomm Incorporated, et al., "TMGI and ECGI Advertisement," S2-151794, SA WG2 Meeting #109, Fukuoka, Japan, May 25-29, 2015, 8 pages.

The International Searching Authority, Foreign Communication From a Related Counterpart Application, PCT Application No. PCT/KR2016/008685, "International Search Report," Nov. 15, 2016, 3 pages, publisher The ISA/KR, International Application Division, Korean Intellectual Property Office, Daejeon, Republic of Korea.

3GPP TR 23.707 V13.0.0 (Dec. 2014), 3rd Generation Partnership Project; Technical Specification Group Services and System Aspects; Architecture Enhancements for Dedicated Core Networks; Stage 2 (Release 13), 39 pages.

NEC, "Update to MMEGI/NRI for dedicated networks re-selection solution," 3GPP TSG SA2 Meeting #106, San Francisco, California, Nov. 17-21, 2014, S2-144068, 3 pages.

Ericsson, "Evaluation of DECOR solutions," SA WG2 Meeting #S2 #106, San Francisco, California, Nov. 17-21, 2014, S2-143947, 5 pages.

Intel, "Resolving Editor's Notes for MME triggered re-direction to dedicated MME solution," SA WG2 Meeting #106, San Francisco, California, Nov. 17-21, 2014, S2-144156, 3 pages.

USPTO, Office Action for U.S. Appl. No. 15/058,794 dated May 18, 2017, 23 pages.

Communication from foreign patent office in a counterpart foreign application, European Patent Office, "Supplementary European Search Report," Application No. EP 16835400.9, dated Jun. 25, 2018, 9 pages.

3GPP TR 23.713 V1.5.0 (Jul. 2015), Technical Report, 3rd Generation Partnership Project; Technical Specification Group Services and System Aspects; Study on extended architecture support for proximity-based services (Release 13), 83 pages.

\* cited by examiner

TERMINAL AND COMMUNICATION METHOD OF THE SAME

CROSS-REFERENCE TO RELATED APPLICATION AND CLAIM OF PRIORITY

The present application is related to and claims the priority under 35 U.S.C. § 119(a) to U.S. Application Ser. No. 62/202,406 filed in the U.S. Patent and Trademark Office on Aug. 7, 2015, the entire content of which is hereby incorporated by reference.

TECHNICAL FIELD

Various embodiment of the present invention relate to a terminal and a communication method of the same.

BACKGROUND

Generally, a mobile communication system has been developed to provide communication while securing mobility of a user. The mobile communication system may provide a voice communication service and a high-speed data communication service by virtue of the rapid progress of technologies.

In recent years, as one of the next-generation mobile communication systems, standardization for a long term evolution (LTE) system in 3rd generation partnership project (3GPP) is in progress. The LTE system has been developed to be commercialized by 2010 and is a technology of implementing high-speed packet based communications having a transmission rate up to 100 Mbps higher than a data transmission rate now being provided and the standardization for the LTE system is almost complete currently.

Meanwhile, the Internet is evolved to an Internet of Things (IoT) network that transmits and receives information, such as things, between distributed components and processes the information, in a human-centered connection network on which human generates and consumes information. The Internet of everything (IoE) technology in which the big data processing technology, etc., by connection with a cloud server, etc., is combined with the IoT technology has also emerged. To implement the IoT, technology elements, such as a sensing technology, a wired and wireless communication and network infrastructure, a service interface technology, and a security technology, have been required. Recently, technologies, such as a sensor network for connection between things, machine to machine (M2M), and machine type communication (MTC), have been researched.

In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, a health care, smart appliances, and an advanced healthcare service by fusing and combining the existing information technology (IT) with various industries.

The IoT technology has been in limelight in various fields and carriers and vendors have developed several applications and systems using the IoT. Among various IoT solutions, in particular, a cellular IoT (hereinafter, 'CIoT') using a licensed frequency band allocated to the cellular system has been in limelight. The cellular system may provide relatively more reliable communication than a non-cellular system, thereby providing the reliable service. In connection with the CIoT, the standardization activities of evolved machine type communication (eMTC), global system for mobile communications enhanced data rates for GSM evolution radio access network (GERAN) CIoT, etc., have been actively progressed and in characteristics of the standardization activities, a need of carriers often has a crucial effect on a standard determination.

The evolved communication technology may provide communications between all things as well as between users, which is expressed by the term 'Internet of Things (IoT)". For example, a user may have various kinds of electronic devices. All the electronic devices are connected to each other by a mobile communication or local area communication technology, various sensors, etc., such that it is possible to provide more convenient functions to the user or perform an efficient control between the devices. The electronic devices may be collectively called an IoT device. An example of another IoT service may include measurement equipment measuring electricity consumption and water consumption of a building and transferring the measured values through a network. As another example, the IoT apparatuses for figuring out safety situations may be installed at public places or remote areas for public safety. When specific events occur, the IoT apparatuses may notify the event situations through a network. As another example, home appliances in a home include a network connection function and thus a device trigger operation of reporting a state of the home appliances or allowing a user to issue a command to the home appliances to perform a specific operation may be performed.

The IoT device includes mobile communication modules such as long term evolution (LTE) or local area communication modules such as Bluetooth, wireless LAN (WiFi), Zigbee, and near-field communication (NFC).

The LTE terminal may also be operated on an LTE carrier frequency and may also be operated on an ISM band.

SUMMARY

Accordingly, embodiments of the present invention are directed to the provision of a method for dividing a kind of Clot traffics to preferentially perform a specific traffic transmission and a method for dividing CIoT-dedicated network equipment and general network equipment supporting a CIoT to allow the CIoT-dedicated network equipment to process more CIoT related signaling.

Further, embodiments of the present invention are directed to the provision of a method for setting up a ProSe per-packet-priority value, which will be applied, in a ProSe UE-NW relay, when a packet is transferred during the provision of a relay service for MBMS traffic through the ProSe UE-NW relay.

Further, embodiments of the present invention are directed to the provision of a method for modifying or generating an EPS bearer to provide an appropriate QoS in an EPS network to remote UE receiving an EPS network service through the ProSe UE-NW relay.

Further, embodiments of the present invention are directed to the provision of a method for allowing a remote UE accessing an IMS network through a ProSe UE-network relay to acquire information on a tracking area code (TAC) and an EUTRAN cell identifier (ECI) included in a P-Access-Network-info header field included in an SIP message and transfer the acquired information to the IMS core network.

Objects of the present invention are not limited to the above-mentioned objects. That is, other objects that are not mentioned may be obviously understood by those skilled in the art to which the present invention pertains from the following description.

Various embodiments of the present invention are directed to the provision of a communication method of a remote terminal, the communication method comprising: transmitting, to a relay terminal, a request message comprising ProSe (proximity based service) per-packet priority associated with a TMGI (temporary mobile group identity); and receiving, from the relay terminal, a MBMS traffic transmitted based on the ProSe per-packet priority.

The request message comprises a TMGI monitoring request message, and the TMGI monitoring request message may further comprise the TMGI and MBMS SAIs (service area identities).

The ProSe per-packet priority may be obtained from an application layer in the remote terminal.

The MBMS traffic may be received over PC5 interface.

The communication method may further comprise receiving, from the relay terminal, a TMGI monitoring response message comprising ProSe layer2 group identifier.

Various embodiments of the present invention are directed to the provision of a communication method of a relay terminal, the communication method comprising: receiving, from a remote terminal, a request message comprising ProSe (proximity based service) per-packet priority associated with a TMGI (temporary mobile group identity); and transmitting, to the remote terminal, a MBMS traffic based on the ProSe per-packet priority.

The request message comprises a TMGI monitoring request message, and the TMGI monitoring request message may further comprise the TMGI and MBMS SAIs (service area identities).

The ProSe per-packet priority may be obtained from an application layer in the remote terminal.

The MBMS traffic may be transmitted over PC5 interface.

The communication method may further comprise: transmitting, to the remote terminal, a TMGI monitoring response message comprising ProSe layer2 group identifier.

Various embodiments of the present invention are directed to the provision of a remote terminal comprising: a transceiver for receiving and transmitting a signal; and a controller for transmitting, to a relay terminal, a request message comprising ProSe (proximity based service) per-packet priority associated with a TMGI (temporary mobile group identity), and for receiving, from the relay terminal, a MBMS traffic transmitted based on the ProSe per-packet priority.

Various embodiments of the present invention are directed to the provision of a relay terminal comprising: a transceiver for receiving and transmitting a signal; and a controller for receiving, from a remote terminal, a request message comprising ProSe (proximity based service) per-packet priority associated with a TMGI (temporary mobile group identity), and transmitting, to the remote terminal, a MBMS traffic based on the ProSe per-packet priority.

According to the embodiment of the present invention, the method for dividing a kind of CIot traffics to preferentially perform a specific traffic transmission and the method for dividing CIoT-dedicated network equipment and general network equipment supporting a CIoT to allow the CIoT-dedicated network equipment to process more CIoT related signaling may be provided.

Further, according to the embodiment of the present invention, the method for setting up a ProSe per-packet-priority value, which will be applied, in a ProSe UE-NW relay, when a packet is transmitted during the provision of a relay service for MBMS traffic through the ProSe UE-NW relay may be provided.

Further, according to the embodiment of the present invention, the method for modifying or generating an EPS bearer to provide an appropriate QoS in an EPS network to remote UE receiving an EPS network service through the ProSe UE-NW relay may be provided.

Further, according to the embodiment of the present invention, the method for allowing a remote UE accessing an IMS network through a ProSe UE-network relay to acquire information on a tracking area code (TAC) and an EUTRAN cell identifier (ECI) included in a P-Access-Network-info header field included in an SIP message and transfer the acquired information to the IMS core network may be provided.

The effects that may be achieved by the embodiments of the present invention are not limited to the above-mentioned objects. That is, other effects that are not mentioned may be obviously understood by those skilled in the art to which the present invention pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
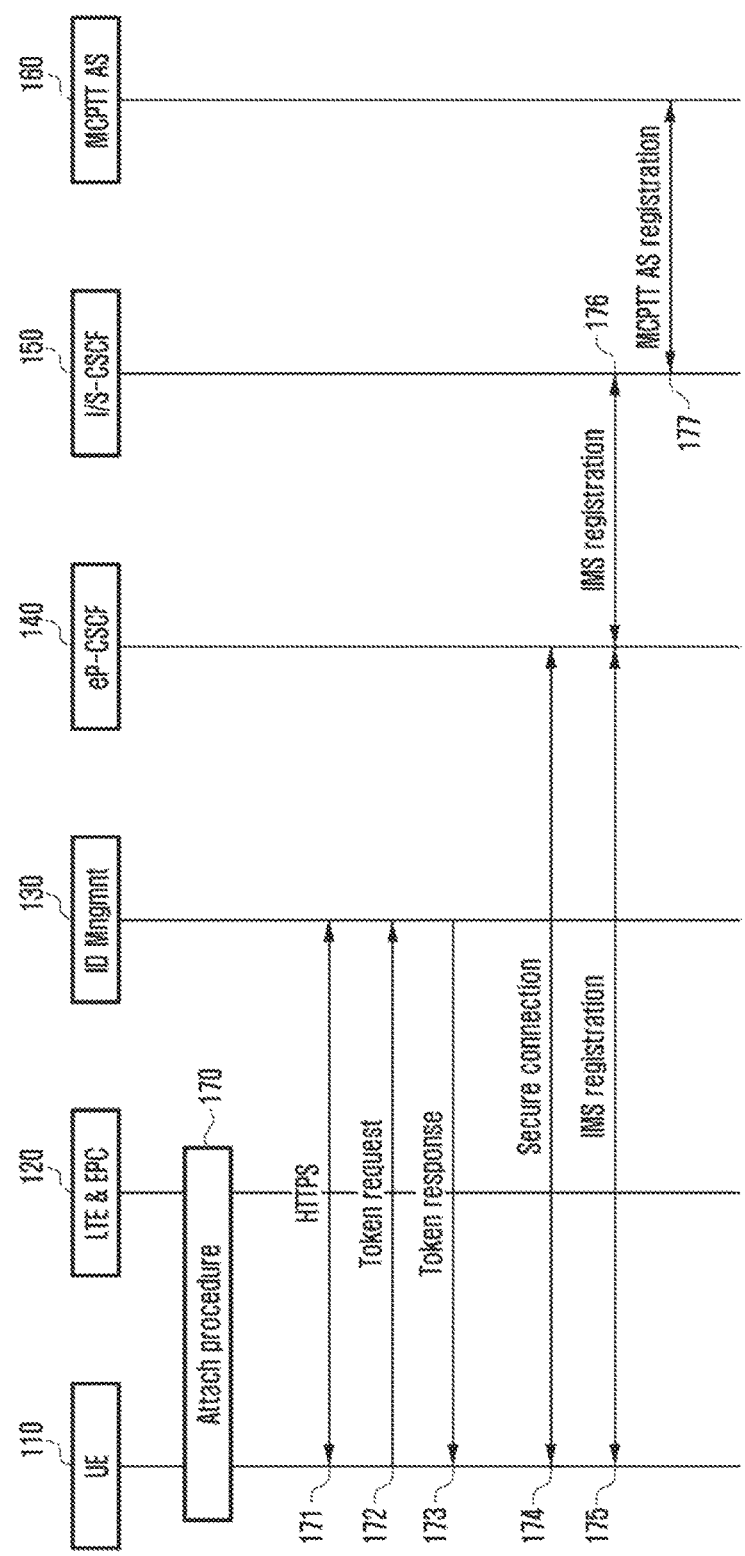
FIG. 1 is a diagram illustrating an example of a process of registering a terminal in a mobile carrier network and an application server, according to an embodiment of the present invention.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

In describing embodiments of the present invention, a description of technical contents which are well known to the art to which the embodiments of the present specification belong and are not directly connected with the embodiments of the present invention will not be described. This is to more clearly transfer a gist of the embodiments of the present specification by omitting an unnecessary description.

It is to be understood that when one component is referred to as being "connected to" or "coupled to" another component in the present specification, it may mean that one component is connected directly to or coupled directly to another component or electrically connected to or coupled to another component with the other component interposed therebetween. Further, in the present specification, "comprising" a specific configuration will be understood that additional configuration may also be included in the embodiments or the scope of the technical idea of the present invention.

Furthermore, constitutional parts shown in the embodiments of the present invention are independently shown so as to represent different characteristic functions. Thus, it does not mean that each constitutional part is constituted in a constitutional unit of separated hardware or one software. That is, for convenience of description, the respective constitutional parts are included by being arranged as each constitutional part and at least two constitutional parts of the respective constitutional parts may form one constitutional part or one constitutional part is divided into a plurality of constitutional parts to perform functions. An integrated embodiments and a separated embodiment of the respective constitutional parts are also included in the scope of the present invention unless departing from the nature of the present invention.

In addition, some of constituents may not be indispensable constituents performing essential functions of the present invention but be selective constituents improving only performance thereof. The present invention may be implemented including only constitutional parts essential to implement the nature of the present invention other than constituents used only for performance improvement and the structure including only the essential constituents other than selective constituents used only for performance improvement is also included in the scope of the present invention.

Hereinafter, when it is determined that in describing the embodiments of the present invention, the detailed description of the known art related to the present invention may obscure the gist of the present invention, the detailed description thereof will be omitted. Hereinafter, embodiments of the present invention will be described in detail with reference to the accompanying drawings. Further, the following terminologies are defined in consideration of the functions in the present invention and may be construed in different ways by the intention of users and operators. Therefore, the definitions thereof should be construed based on the contents throughout the specification.

In this case, it may be understood that each block of processing flow charts and combinations of the flow charts may be performed by computer program instructions. Since these computer program instructions may be installed in processors of a general computer, a special computer, or other programmable data processing apparatuses, these computer program instructions executed through the process of the computer or the other programmable data processing apparatuses create means performing functions described in block(s) of the flow chart. Since these computer program instructions may also be stored in a computer usable memory or a computer readable memory or other programmable data processing apparatuses that may direct a computer or other programmable data processing apparatuses in order to implement functions in a specific scheme, the computer program instructions stored in the computer usable memory or the computer readable memory may also produce manufacturing articles including instruction means performing the functions described in the block(s) of the flow chart. Since the computer program instructions may also be installed in a computer or other programmable data processing apparatuses, they perform a series of operation steps on the computer or the other programmable data processing apparatuses to create processes executed by the computer, such that the computer program instructions executing the computer or the other programmable data processing apparatuses may also provide steps for performing the functions described in the block(s) of the flow chart.

Here, the term '-unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, as one example, the '~unit' includes components such as software components, object oriented software components, class components, and task components and includes processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more CPUs within a device or a security multimedia card.

Further, the exemplary embodiments of the present invention will mainly describe in detail the long-term evolution (LTE) and the evolved packet core (EPC) that are a radio access network (RAN) and a core network (CN) defined in the 3rd Generation Partnership Project (3GPP) organization. However, a main subject of the present invention can be applied to even other communication systems having the similar technical background with a slight change without greatly deviating from the scope of the present invention, which may be made under the determination of a person having ordinary skill in the art to which the present invention pertains.

For example, a mission critical push to talk (MCPTT) service is mainly described as an example, but the present invention may be generally applied to other services without a great change. All information transmitted through each message and step is not necessarily transferred and some of the defined information may be transferred if necessary.

First, a method and an apparatus for registering a user (for example, terminal) in a mobile carrier network and an application server will be described.

In order that a user attaches a mobile communication network to use a service, mobile communication terminals (or user equipment (UE), terminal, or the like) need to be registered in the mobile carrier network and the application server (AS). There is a need to authenticate whether the user is a user having authority to use the corresponding service during the registration. The present invention provides the authentication process on whether the user is a user having authority to use the corresponding service. Further, a method for allowing a session initiation protocol (SIP) core (enhanced proxy call session control function (eP-CSCF), interrogating call session control function (I-CSCF), serving call session control information (S-CSCF)) not to know mission critical push to talk (MCPTT) identity (or identification) (ID) of a user is provided.

For this purpose, in the present invention, two types of tokens are defined. In this case, the two types of tokens may each be called, for example, token A and token B. Alternatively, the two types of tokens may also be called a first token and a second token or a first type token and a second type token, or the like, but are not limited thereto. Therefore, any term that may differentiate the two types of tokens may be used. Hereinafter, for convenience of description, the token A and the token B are used to differentiate the two types of tokens. The token A and the token B may be managed by an identity (ID) management server 130. Further, when the ID management server 130 receives a request from a terminal 110, the ID management server 130 may provide a token to the terminal 110. According to the embodiment of the present invention, the terminal 110 may also acquire a token from several ID management servers 130.

In this case, the token A may be a token used at a MCPTT service level. If the terminal 110 transmits a service request including the token A, an MCPTT server (or MCPTT application server) 160 may derive an MCPTT user ID from the corresponding token A. By the process, an MCPTT service provider may hide the MCPTT user ID from SIP cores 140 and 150.

The token B may be a token used at an SIP level. If there are no IMS identities required to use an internet protocol multimedia subsystem (IMS IP) service, the terminal may derive and use IMS identities from the token B.

Hereinafter, a process of registering a terminal in a mobile carrier network and an application server will be described in detail by steps with reference to the accompanying drawings.

FIG. 1 is a diagram illustrating an example of a process of registering a terminal in a mobile carrier network and an application server, according to an embodiment of the present invention.

Referring to FIG. 1, in step 170, a user may turn on a power supply of the terminal 110. Accordingly, the terminal 110 may perform an attach procedure (authentication) to a mobile communication network 120. Further, the terminal 110 may attach the mobile communication network 120 to acquire an IP address, thereby acquiring IP connectivity.

In step 171, the terminal 110 enables an MCPTT client. The terminal 110 attaches a uniform resource identifier (URI) of the ID management server to start a hypertext transfer protocol over secure socket layer (HTTPS) connection. A transport layer security (TLS) connection using the HTTPS performs unidirectional server authentication based on a server certificate. The MCPTT client starts a user authorization procedure. The MCPTT terminal 110 may provide user credentials information (for example, biometrics, secureID, username/password, or the like) to the ID management server 130 for verification.

In step 172, the terminal 110 may request the token A to be used for the registration in the MCPTT server 160 to the ID management server 130. In this case, the terminal 110 may transfer a token request message including the information requesting the token A to the ID management server 130. Further, in step 173, the terminal 110 may receive the token A from the ID management server 130 as a response thereto. In this case, the terminal 110 may receive a token response message including the token A from the ID management server 130.

When there is no IMS use credentials information or the corresponding credentials information may not be used for the IMS registration, in the step 172, the terminal 110 may additionally request the token B to the ID management server 130. Therefore, in the step 173, the terminal 110 may receive the token B from the ID management server 130.

In this case, according to the embodiment of the present invention, the terminal 110 may receive the token A and the token B from the same ID management server 130 or different ID management servers 130.

Next, in step 174, the terminal 110 may be secure-connected with the SIP core 140 for the authentication and registration of the SIP level. FIG. 1 exemplarily illustrates that the terminal 110 is secure-connected with the eP-CSCF 140.

Further, in steps 175 and 176, the terminal 110 may perform the registration in the SIP cores 140 and 150 using the IMS use credentials information or the token B.

When the token B is used, the eP-CSCF 140 may derive the IMS identities from the corresponding token B. At this time, the IMS identities derived from the token B may be transferred to the terminal 110 while being included in an OK response message. Further, the derived IMS identities are used in the SIP message transmitted from the terminal 110. Meanwhile, the terminal 110 may transfer the token A included in the SIP register message to the S-CSCF 150.

Next, in step 177, the S-CSCF 150 may transfer the token A and the IMS identities to the MCPTT server 160. The MCPTT server 160 may verify the token A. Further, if the token A is valid, the MCPTT server 160 may derive the MCPTT user ID from the token A. Further, the connection information between the MCPTT user ID and the IMS identities may be managed by the MCPTT server 160.

Next, a method for managing quality of group communication will be described.

Figure 2:
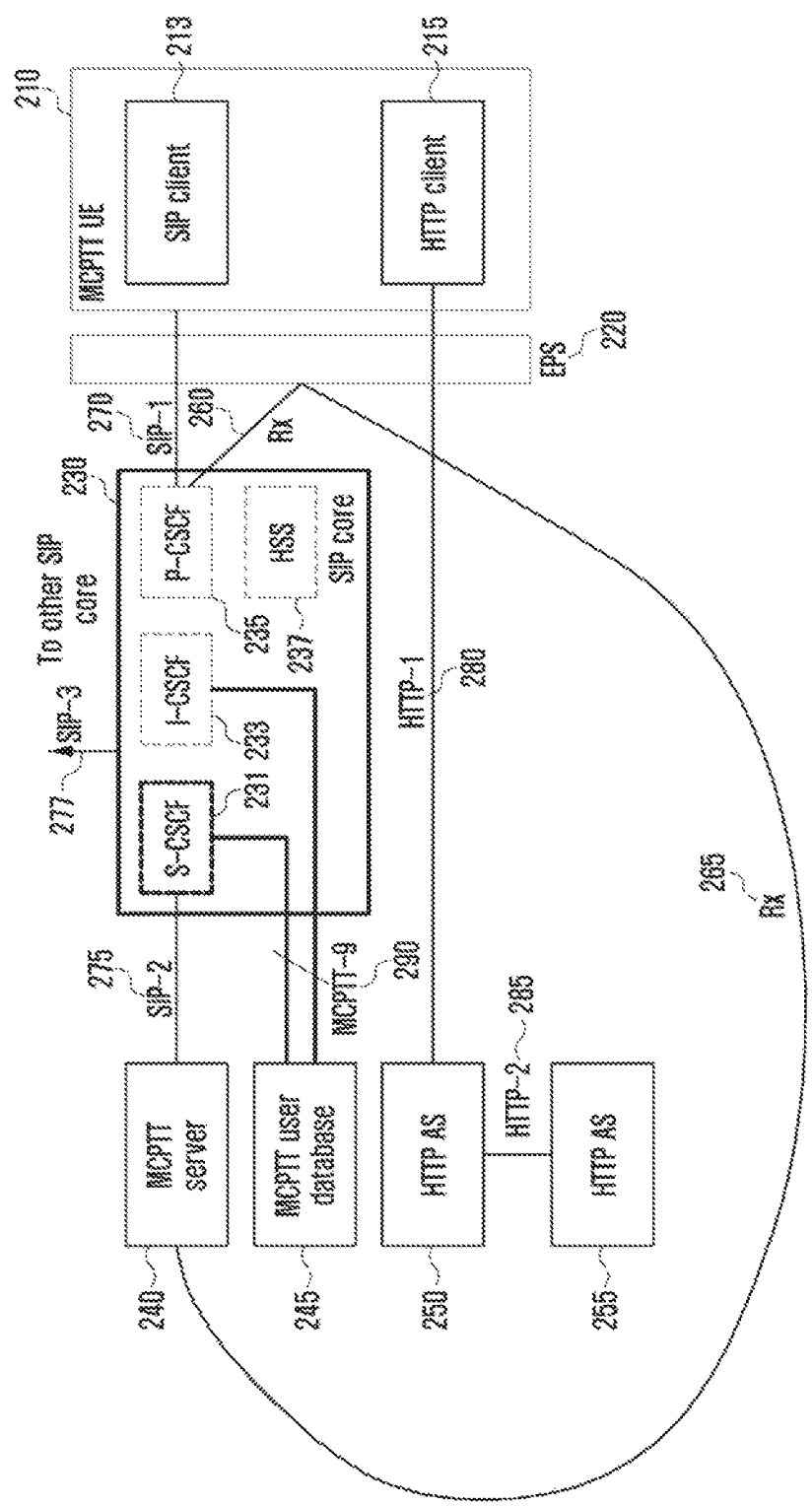
FIG. 2 is a diagram illustrating an embodiment of an Rx interface according to an embodiment of the present invention.

FIG. 2 is a diagram illustrating an embodiment of an Rx interface according to an embodiment of the present invention.

Referring to FIG. 2, a user terminal (or terminal, MCPTT terminal, MCPTT user terminal) 210 may include an SIP client 213 and an HTTP client 215. Further, the SIP client 213 may be connected to an SIP core 230 through an SIP-1 interface 270 and the HTTP client 215 may be connected to the HTTP application server (AS) 250. Further, the HTTP AS 250 may be connected to another HTTP AS and an HTTP-2 interface 285. Further, the SIP core 230 may include an S-CSCF 231, I-CSCF 233, P-CSCF 235, and a home subscriber server (HSS) 237. The P-CSCF 235 of the SIP core 230 may be connected to the terminal 210 through the SIP-1 interface 270. Further, the S-CSCF 231 may be connected to the MCPTT server 240 through an SIP-2 interface 275 and the S-CSCF 231 and the I-CSCF 233 may be connected to an MCPTT user database through an MCPTT-9 interface. The SIP core 230 may be connected to another core (not illustrated) through an SIP-3 interface 277.

In this case, in the LTE mobile communication system, for QoS management of an IMS service session provided to the user terminal 210, a first Rx interface 260 between P-CSCF entity 235 and policy and charging rules function (PCRF) entity (for example, evolved packet system (EPS)) 220 may be defined and the QoS may be controlled by the corresponding interface 260.

In the present invention, in addition to the existing LTE mobile communication system structure, a second RX interface 265 between an application server (MCPTT server, MCPTT application server) 240 and the PCRF 220 is defined. Therefore, the first Rx interface 260 between the P-CSCF 235 and the PCRF 220 and the second interface 265 between the MCPTT server 240 and the PCRF 220 may be defined. Accordingly, the application server 240 may provide QoS requirements to the PCRF 220 without passing through the PCCF 235. For operation consistency of the PCRF 220, only one of the RX interfaces 260 and 265 for the application server 240 and the P-CSCF 235 needs to be used and which of the two Rx interfaces 260 and 265 is used may be pre-configured.

As illustrated in FIG. 2, the Rx interfaces 260 and 265 may be defined between the PCRF 220 and the P-CSCF 235 and/or between the PCRF 220 and the MCPTT server 240. In this case, the PCRF 220 is hard to operate while receiving (transmitting) information from two entities (that is, P-CSCF 235 and MCPTT server 240). The reason is that when the MCPTT server 240 and the P-CSCF 235 each transmit inconsistent information to the PCRF 220, it is difficult for the PCRF 220 to process the received information. On the contrary, if the two entities 235 and 240 provide the same information, one of the two entities 235 and 240 generates meaningless signaling, which may not be considered as a preferred operation. Therefore, one of the two entities 235 and 240 needs to be selected on the basis of an operator policy and/or other pre-configured criteria.

Both the Home and serving PLMN ID(s) are needed to identify the contact point for the Rx interfaces 260 and 265, in addition to existing parameters as defined in TS 23.203. The MCPTT AS 240 finds the entry point at the HPLMN using the home PLMN ID, the MCPTT AS 240 finds the entry point at the VPLMN using the serving PLMN ID. Within the PLMN, the information listed in TS 23.203 is used to find the PCRF 220.

The MCPTT AS 240 is configured with mapping information which contains an IP address range and the corresponding PLMN which is responsible for this IP address range {(IP x . . . IP y)->PLMN ID}.

In roaming scenarios, the MCPTT AS 240 receives the UE IP address, the HPLMN ID and the VPLMN ID via MCPTT-1 signaling from the UE 210. If the configured PLMN entry corresponding to the UE's IP address matches the HPLMN ID sent by the UE 210, the MCPTT AS 240 selects a PCRF 220 from the UE's HPLMN (hPCRF) using the procedures defined in TS 23.203. Otherwise, the MCPTT AS 240 may select a PCRF 220 from either the HPLMN or the VPLMN using the procedures defined in TS 23.203. The MCPTT AS 240 makes this selection based on agreements with HPLMN/VPLMN operators.

The information to be transferred through the Rx interfaces 260 and 265 may be as follows.
Media or flow description (e.g. SDP);
Priority;
MCPTT Group ID;
MCPTT User ID and/or IMPU; and/or
Call type.

The MCPTT AS 240 may directly transfer all or some of the information to the PCRF 220 through the second Rx interface 265, and the MCPTT AS 240 may transfer all or some of the information to the SIP core 230 through the SIP-2 275 and thus the P-CSCF 235 may transfer all or some of the information to the PCRF 220 through the first Rx interface 260. Further, the PCRF may newly establish a bearer or modify the existing bearer, according to the collected information.

Next, a method for efficiently transferring broadcasting related signaling will be described.

Figure 3:
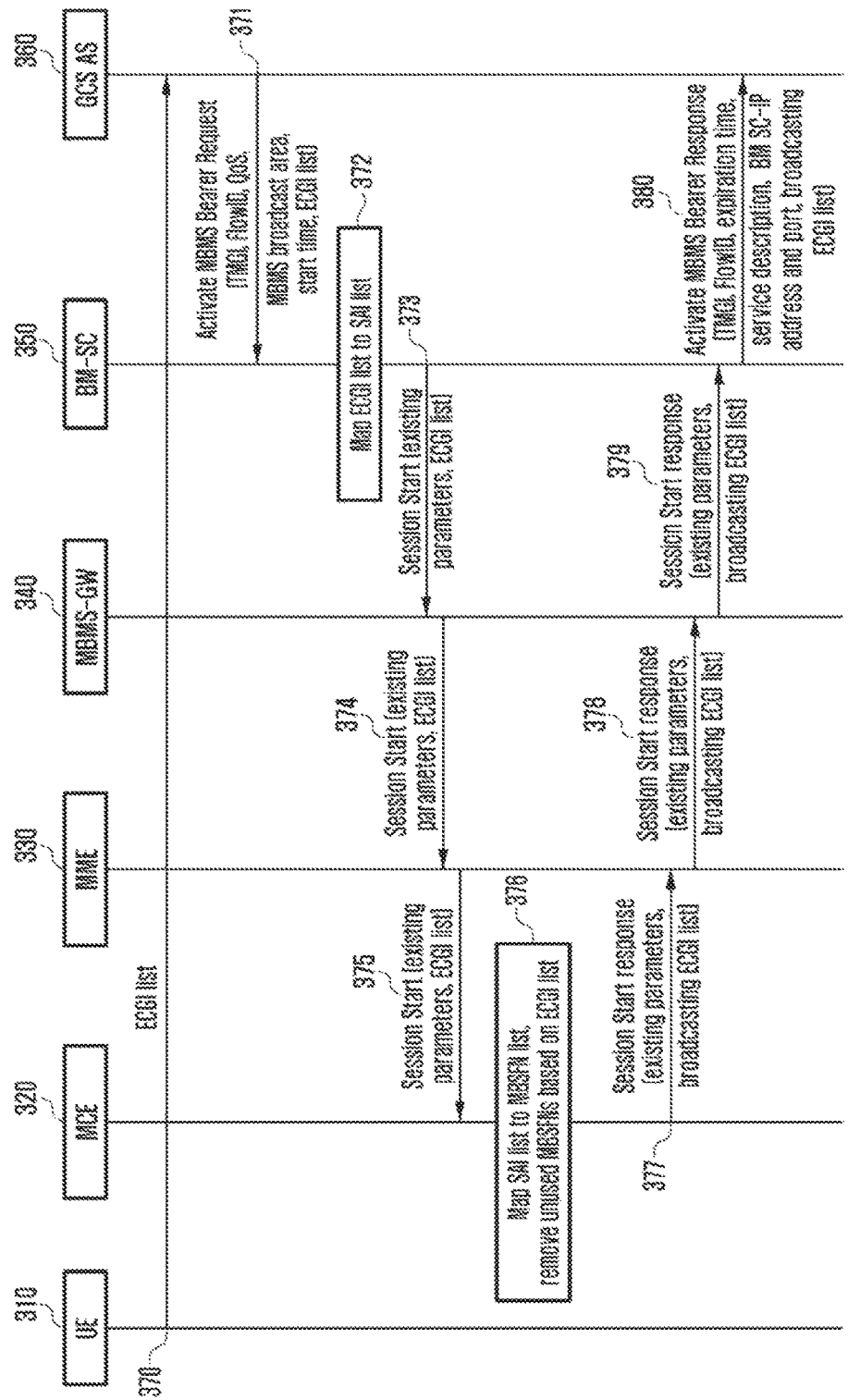
FIG. 3 is a diagram illustrating an example of a method for transferring broadcasting related signaling according to an embodiment of the present invention.

FIG. 3 is a diagram illustrating an example of a method for transferring broadcasting related signaling according to an embodiment of the present invention.

Referring to FIG. 3, in step 370, user equipment (UE) 310 may transmit an E-UTRAN cell global identifier list to a group communication service application server (GCS AS) 360. In this case, the ECGI list may include a list of ECGIs. Further, the GCS AS 360 may define whether to transmit the ECGI list to a broadcast multicast service center 350 according to configuration information. The configuration information may be available in the GCS AS 360 according to the operator policy and by the implementation method. Further, according to the embodiment of the present invention, the configuration information may also be available in the GCS AS 360 by the signaling between the BM-SC 350 and the GCS AS 360.

In order that the GCS AS 360 activates a multimedia broadcast multicast service (MBMS) bearer through the MB2 interface, in step 371, the GCS AS 360 may transmit an activate MBMS bearer request message to the BM-SC 350.

In this case, the activate MBMS bearer request message may include at least one of temporary mobile group identity (TMGI), Flow ID, QoS, an MBMS broadcast area, and an MBMS start time. The TMGI may identify the MBMS bearer. The flow ID is included in the activate MBMS bearer request message only when the TMGI is included in the activate MBMS bearer request message and may be used to differentiate a specific flow in MBMS traffic corresponding to the TMGI. If the flow ID is included in the activate MBMS bearer request message, the BM-SC 350 may associate the Flow ID with the TMSI transferred from the activate MBMS bearer request message and associate the Flow ID with the MBMS broadcast area. The QoS value may be mapped to a value representing priority of the MBMS bearer. If the MBMS broadcast area includes a list of cell IDs, the BM-SC 350 maps the cell IDs to a set of MBMS service areas (SAs). According to the embodiment of the present invention, the GCS AS 360 may transmit the MBMS SA when transferring the ECGI list to the BM-SC 350. The BM-SC 350 may disregard the MBMS SA received from the GCS SA 360 and rewrite the MBMS SA obtained as described above to the MAMS SA received from the GCS SA 360. When receiving the ECGI list, the BM-SC 350 may transmit the MBMS SA to the GCS AS 360 while putting the MBMS SA in the activate MBMS bearer response message. By using this, the GCS AS 360 may be used to configure the MBMS service data. When not receiving the ECGI list, the BM-SC 350 does not put the MBMS SA in the activate MBMS bearer response message.

In step 372, the BM-SC 350 may map the cell ID list (that is, ECGIs of the ECGI list) to a service area list (SAIs) and may determine at least one MBMS gateway (MBMS-GW(s)) 340 for a related area.

Further, in step 373, the BM-SC 350 may transmit a session start message to the MBMS-GW(s) 340 determined in the step 372. The session start message may include an MBMS related parameter meeting 3GPP Release-12. Further, according to the embodiment of the present invention, the session start message may include the cell ID list (that is, ECGI list).

In step 374, the MBMS-GW 340 may transmit the session start message to involved mobility management entity (MME(s)) 330. The session start message may include the MBMS related parameter meeting the 3GPP Release-12. Further, according to the embodiment of the present invention, the session start message may include the cell ID list (that is, ECGI list).

Further, in step 375, an MME 330 may transmit the session start message to involved multicell multicast coordination entity (involved MCE(s)) 320. The session start message may include the MBMS related parameter meeting the 3GPP Release-12. Further, according to the embodiment of the present invention, the session start message may include the cell ID list (that is, ECGI list).

Meanwhile, when choosing a receiving object of the session start message, the MME 330 may use the ECGI list and the MBMS SA received in the step 374. The MME 330 may receive an MEC identifier to which the base station (evolved Node B (eNB)) is connected or the MCE identifier to which a cell within the base station is connected during an S1 setup or an eNB configuration update. Alternatively, the MME 330 may receive a cell or a base station list connected to an MCE 320 during an M3 setup or an MCE configuration update. By using the information, the MME 330 may transfer the session start message only to the base station (not illustrated) corresponding to the received ECGI list. The MME 330 may identify the base station by looking a global eNB ID portion of the ECGI. Therefore, the MME 330 may choose the suitable MCE 320 using the serving MCE information and ECGI information for each base station during the S1 setup or the eNB configuration update.

Next, in step 376, the MCE 320 may map the SAI list received from the session start message received from the MME 330 to a multicast broadcast over a single frequency network (MBSFN) list and remove the MBSFN that is not used in the corresponding ECGI list. The MCE 320 may allocate resources for the MBMS bearer to the allocated or selected MBSFNs. Further, the MCE 320 may store the cell ID list (that is, ECGI list) of the MBSFN in which the MBMS bearer is activated.

In step 377, the MCE 320 may transfer a session start response message to the MME 330. The session start response message may include the MBMS related parameter meeting the 3GPP Release-12. Further, according to the embodiment of the present invention, the session start response message may include the cell ID list (that is, ECGI list) in which the MBMS bearer is activated.

Further, in step 378, the MME 330 may transfer the session start response message to the MBMS-GW 340. The session start response message may include the MBMS related parameter meeting the 3GPP Release-12. Further, according to the embodiment of the present invention, the session start response message may include the cell ID list (that is, ECGI list) in which the MBMS bearer is activated by the session start response message.

Next, in step 379, the MBMS-GW 340 may transfer the session start response message to the BM-SC 350. The message may include the MBMS related parameter meeting the 3GPP Release-12. Further, according to the embodiment of the present invention, the session start response message may include the cell ID list (that is, ECGI list) in which the MBMS bearer is activated by the session start response message.

In step 380, the BM-SC 350 may transmit the activate MBMS bearer response message to the GCS AS 360. The activate MBMS bearer response message may include at least one of TMGI, flow ID (If the flow ID is included in the activate MBMS bearer request message, the activate MBMS bearer response message may include the same value of the flow ID included in the activate MBMS bearer request message. Or the activate MBMS bearer response message may include the flow ID allocated from the BM-SC 350), MBMS service description, an IP address and a port number of the BM-SC 350 for a user data transmission plane, and expiration time. The MBMS service description include MBMS bearer related configuration information, which may include at least one of information (for example, MBMS service area, radiofrequency, IP multicast address, APN, or the like) arranged in TS 26.346. When the BM-SC 350 allocates the TMGI, the expiration time represents expiration time of the corresponding TMGI. If the BM-SC 350 receives the ECGI list in the step 371, the BM-SC 350 may include the ECGI list in the activate MBMS bearer response message by the procedure.

If the BM-SC 350 transmits the activate MBMS bearer response message in step 379 prior to receiving the session start response message and the ECGI list included in the session start response message received in the step 379 is different from the ECGI list included in the activate MBMS bearer request message received in the step 371, the BM-SC 350 may transmit the activate MBMS bearer response message including the ECGI list received in the step 379 to the GCS-AS 360 and update the transmitted activate MBMS bearer response message to notify the GCS-AS 360 of the ECGI list in which a current MBMS bearer is activated.

Figure 4:
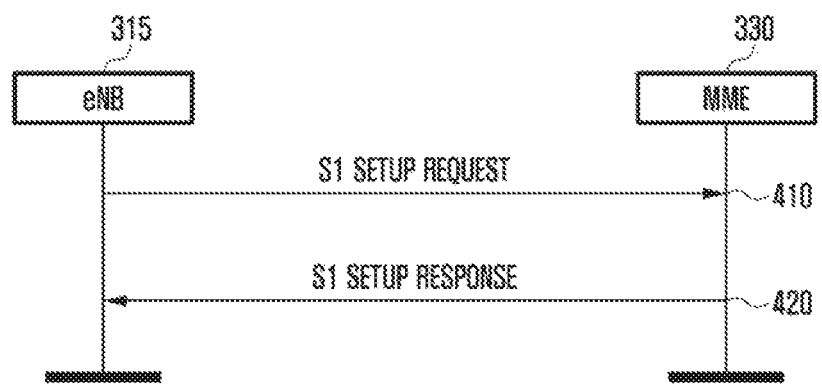
FIG. 4 is a diagram illustrating an SI setup process between a base station and an MME according to an embodiment of the present invention.
Figure 5:
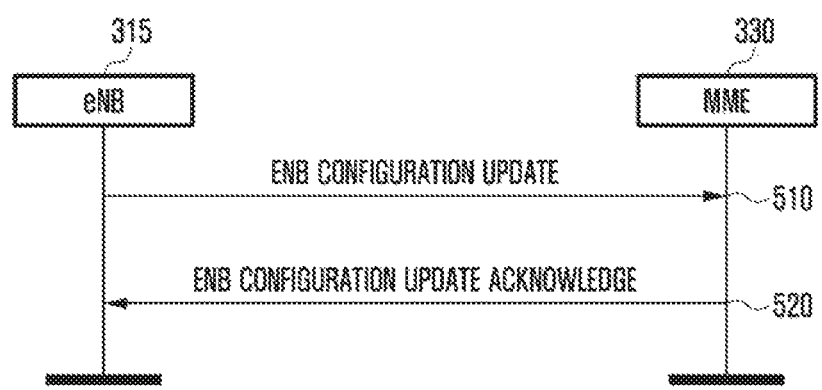
FIG. 5 is a diagram illustrating an eNB configuration update process between the base station and the MME according to an embodiment of the present invention.
Figure 6:
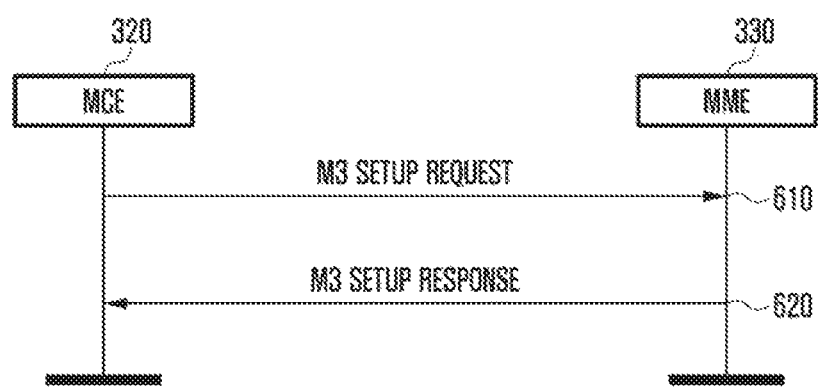
FIG. 6 is a diagram illustrating an M3 setup process between an MCE and the MME according to an embodiment of the present invention.
Figure 7:
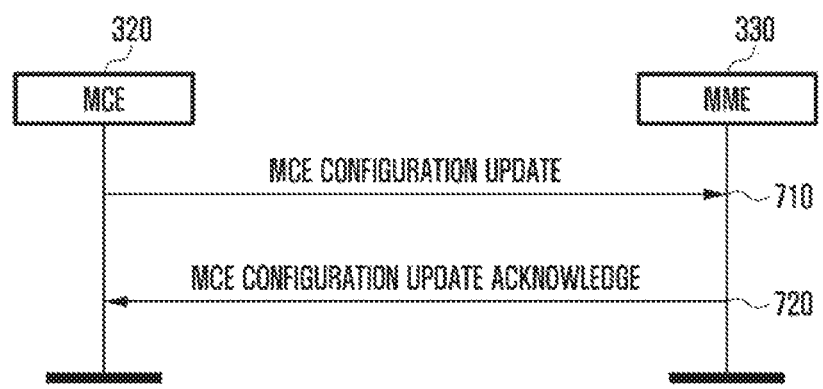
FIG. 7 is a diagram illustrating an MCE configuration update process between the MCE and the MME according to an embodiment of the present invention.

FIG. 4 is a diagram illustrating an SI setup process between a base station and an MME according to an embodiment of the present invention, FIG. 5 is a diagram illustrating an eNB configuration update process between the base station and the MME according to an embodiment of the present invention, FIG. 6 is a diagram illustrating an M3 setup process between the base station and the MME according to an embodiment of the present invention, and FIG. 7 is a diagram illustrating an MCE configuration update process between an MCE and the MME according to an embodiment of the present invention.

The MCE 320 information served by a base station 315 may be exchanged between the base station 315 and the MME 330 by using the following procedure and message.

Referring to FIG. 4, in step 410, the base station 315 may transmit an S1 setup request message to the MME 330 and in step 420, the base station 315 may receive an S1 setup response message from the MME 330.

In this case, the S1 setup request message may be defined like the following [Table 1] and [Table 2].

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString (SIZE(1 . . . 150, . . . )) | | YES | ignore |
| Supported TAs | | 1 . . . <maxnoofTACs> | | Supported TAs in the eNB. | GLOBAL | reject |
| >TAC | M | | 9.2.3.7 | Broadcasted TAC. | — | |
| >Broadcast PLMNs | | 1 . . . <maxnoofBPLMNs> | | Broadcasted PLMNs. | — | |
| >>PLMN Identity | M | | 9.2.3.8 | | | |
| Default Paging DRX | M | | 9.2.1.16 | | YES | ignore |
| CSG Id List | | 0 . . . 1 | | | GLOBAL | reject |
| >CSG Id | M | 1 . . . <maxnoofCSGIds> | 9.2.1.62 | | | |
| Serving MCE | O | <maxnoofMCEs> | 9.2.1.xx | | YES | ignore |

TABLE 2

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256. |
| maxnoofMCEs | Maximum no. of MCEs. Value is 256. |

Further, referring to FIG. 5, in step 510, the base station 315 may transmit the eNB configuration update message to the MIME 330 and in step 520, receive an eNB configuration update acknowledgement message from the MIME 330.

In this case, the eNB configuration update message may be formed like the following [Table 3] and [Table 4].

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | reject |

TABLE 3-continued

| IE/Group Name | Presence | Range | IE type and reference | Semantics description | Criticality | Assigned Criticality |
|---|---|---|---|---|---|---|
| eNB Name | O | | PrintableString (SIZE (1 . . . 150, . . . )) | | YES | ignore |
| Supported TAs | | 0 . . . <maxnoofTACs> | | Supported TAs in the eNB. | GLOBAL | reject |
| >TAC | M | | 9.2.3.7 | Broadcasted TAC. | — | |
| >Broadcast PLMNs | | 1 . . . <maxnoofBPLMNs> | | Broadcasted PLMNs. | | |
| >>PLMN Identity | M | | 9.2.3.8 | | — | |
| CSG Id List | | 0 . . . 1 | | | GLOBAL | reject |
| >CSG Id | | 1 . . . <maxnoofCSGId> | 9.2.1.62 | | — | |
| Default Paging DRX | O | | 9.2.1.16 | | YES | ignore |
| Serving MCE | O | <maxnoofMCEs> | 9.2.1.xx | | YES | ignore |

TABLE 4

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256. |
| maxnoofMCEs | Maximum no. of MCEs. Value is 256. |

Meanwhile, referring to FIG. 6, in step 610, the MCE 320 may transmit an M3 setup request (S1 setup request) message to the MME 330 and in step 620, the MCE 320 may receive an M3 setup response (S1 setup response) message from the MME 330.

Further, referring to FIG. 7, in step 710, the MCE 320 may transmit an MCE configuration update message to the MME 330 and in step 720, the MCE 320 receive an MCE configuration update acknowledge message from the MME 330.

Meanwhile, the global MCE ID may be defined as the following [Table 5]. The ID may be used at the time of establishing the M3 setup between the MCE 320 and the MME 330 or updating the MCE configuration.

TABLE 5

| IE/Group Name | Presence | Range | IE type and reference | Semantics description |
|---|---|---|---|---|
| PLMN Identity | M | | | |
| MCE ID | M | | OCTET STRING (SIZE(2)) | |
| MCE ID Extension | O | | OCTET STRING (SIZE(1)) | Extension of the Global MCE ID. |

In this case, the M3 setup request message may be defined like the following [Table 6] and [Table 7].

TABLE 6

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global MCE ID | M | | 9.2.1.10 | | YES | reject |
| MCE Name | O | | PrintableString (1 . . . 150, . . . ) | | YES | ignore |
| MBMS Service Area List | | 1 | | | YES | reject |
| >MBMS Service Area List Item | | 1 to <maxnoofMBMSServiceAreaIdentitiesPerMCE> | | Supported MBMS Service Area Identities in the MCE | GLOBAL | reject |
| >>MBMS Service | M | | OCTET STRING | MBMS Service | | |

TABLE 6-continued

| IE/Group Name | Presence | Range | IE type and reference | Semantics description | Criticality | Assigned Criticality |
|---|---|---|---|---|---|---|
| Area 1 | | | (2) | Area Identities as defined in TS 23.003 [13]. | | |
| eNB list or cell list > Global eNB ID or ECGI | | 1 to n | | | | |

TABLE 7

| Range bound | Explanation |
|---|---|
| maxnoofMBMSServiceAreaIdentitiesPerMCE | Maximum no. of Service Area Identities per MCE. The value for maxnoofMBMSServiceAreaIdentities is 65536. |

Further, the MCE configuration update message may be formed like the following [Table 8] and [Table 9].

Next, a method for managing quality of group communication will be described.

TABLE 8

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global MCE ID | O | | 9.2.1.10 | | YES | reject |
| MCE Name | O | | PrintableString (1 . . . 150, . . . ) | | YES | ignore |
| MBMS Service Area List | | 0 . . . 1 | | | YES | reject |
| >MBMS Service Area List Item | | 1 to <maxnoofMBMSServiceAreaIdentitiesPerMCE> | | Supported MBMS Service Area Identities in the MCE | GLOBAL | reject |
| >>MBMS Service Area 1 | M | | OCTET STRING (2) | MBMS Service Area Identities as defined in TS 23.003 [13]. | | |
| eNB list or cell list > Global eNB ID or ECGI | | 1 to n | | | | |

TABLE 9

| Range bound | Explanation |
|---|---|
| maxnoofMBMSServiceAreaIdentitiesPerMCE | Maximum no. of Service Area Identities per MCE. The value for maxnoofMBMSServiceAreaIdentities is 65536. |

Throughout the present specification, the CIoT represents an IoT service (cellular IoT) using a cellular network. The cellular network means a mobile communication network and includes 2G represented by GERAN, 3G represented by GPRS, and 4G represented by LTE. The CIoT service may mean a cellular service for supporting an internet of things (IoT) terminal and may mean a service transmitting a small capacity of data through the cellular network. Further, the CIoT service may include a machine type communication (MTC) service.

The Clot is that a large number of terminals may be simultaneously connected to the network and the network may simultaneously transfer data to a large number of terminals. Therefore, it is expected that a network congestion situation may be more severe than a general cellular system. Therefore, a method for reducing a congestion situation due to CIoT by setup and signaling between network apparatuses and a method for processing priority depending on a kind of CIoT traffic in a congestion situation are required. The kind of CIoT traffic may include a periodic report data, a data reported when an aperiodic event is generated, a command data issuing a command through the network to allow an apparatus to trigger a specific operation, an update data for updating software/firmware of an IoT apparatus and changing a setup thereof, a data for public safety, or the like. To increase the quality of service in the network congestion situation, a CIoT data depending on the aperiodic event needs to be preferentially transferred through the network over the periodically transferred CIoT data. Otherwise, a user may late receive a CIoT data depending on an aperiodic data notifying the occurrence of the emergency situation late due to the congestion of the periodically transferred CIoT data, which may cause the reduction in quality of service and reliability that the user feels.

For convenience, in the present invention, a user plane data transmitted from a terminal is called a data and a control plane data is called signaling. The term is not limited the name and other terms dividing a packet transmitted for providing a data and a control signal transmitted for providing a service in a network may be used. Further, a term indicating control information used in the following description, a term meaning a user data transferred to an application server, a term meaning signaling for transferring control information between network apparatuses, a term (for example, event report data, periodic report data) indicating a kind of traffics, a term indicating components of an apparatus, etc., are exemplified for convenience of explanation. Accordingly, the present invention is not limited to terms to be described below and other terms having the equivalent technical meaning may be used.

Further, some of the terms and names defined in the 3rd generation partnership project long term evolution (3GPP LTE) may be used. However, the present invention is not limited to the terms and names but may also be identically applied to the system according to other standards.

Figure 8:
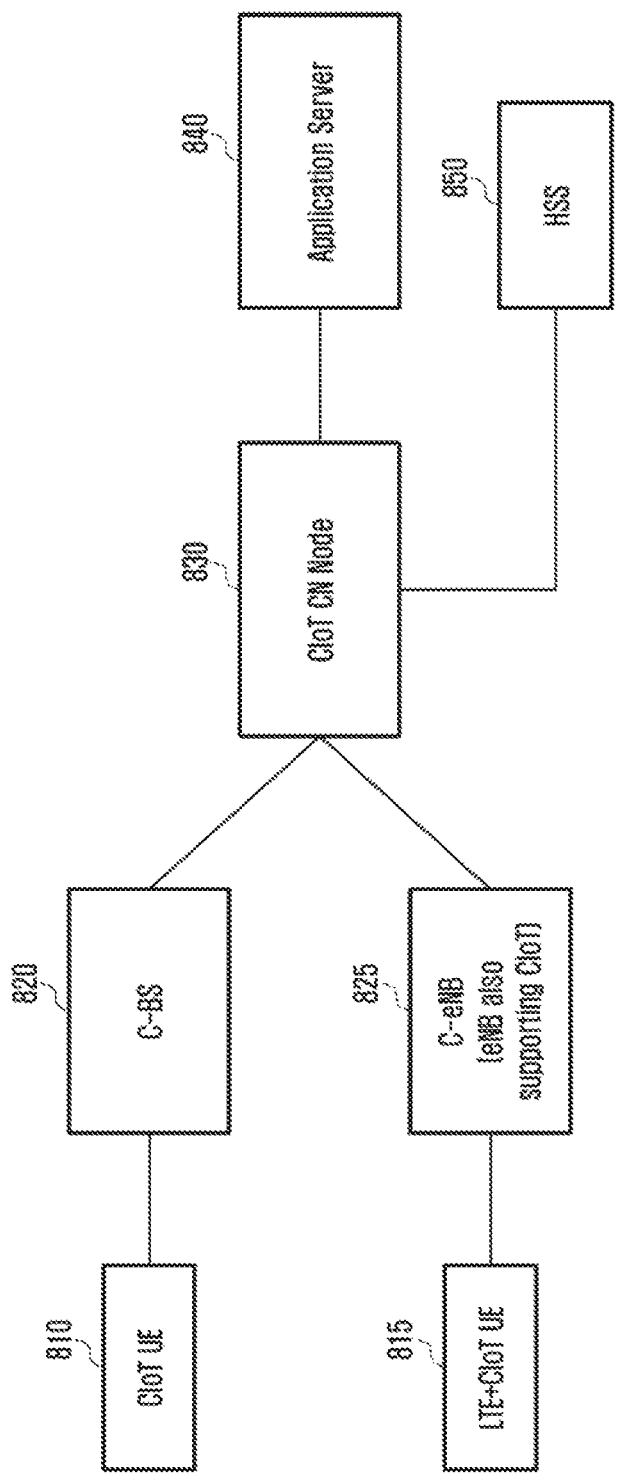
FIG. 8 is a diagram illustrating an example of a network structure supporting a CIoT service according to an embodiment of the present invention.
Figure 9:
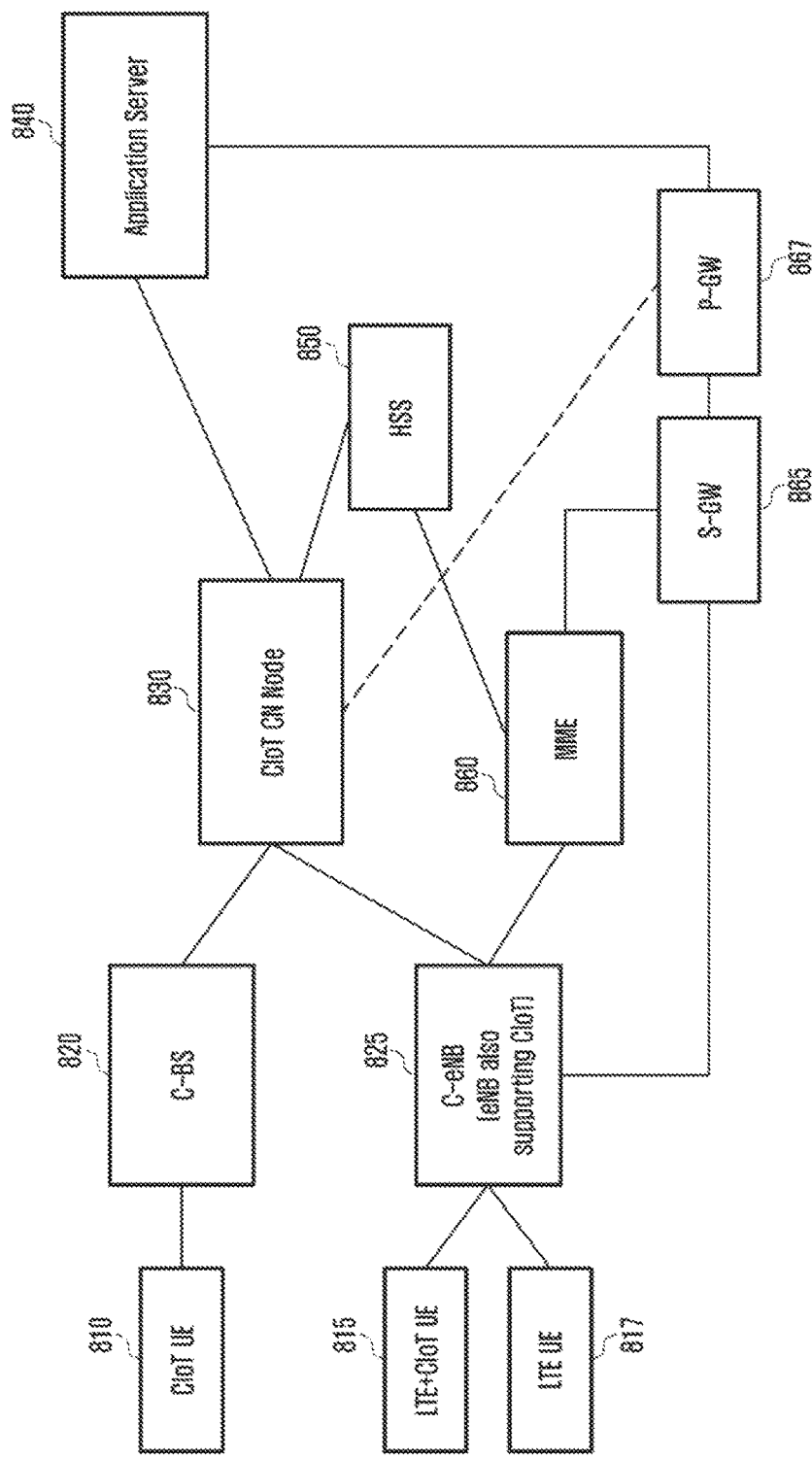
FIG. 9 is a diagram illustrating another example of the network structure supporting a CIoT service according to an embodiment of the present invention.

FIG. 8 is a diagram illustrating an example of a network structure supporting a CIoT service according to an embodiment of the present invention and FIG. 9 is a diagram illustrating another example of the network structure supporting a CIoT service according to an embodiment of the present invention.

The LTE terminal 817 and the IoT terminal 810 mean a mobile terminal that may perform radio communication and may be, for example, a personal digital assistant (PDA), a smart phone, a mobile phone, a tablet computer, a notebook, etc., that include a communication function and may mean a measurement terminal for confirming water consumption, electricity consumption, and temperature, a terminal for recognizing and reporting a situation such as a fire alarming device and an earthquake alarming device, and home appliances having a communication function such as an air conditioner, a refrigerator, an air cleaner, a boiler, and a cleaner, in addition to individual equipment. In addition to the above-mentioned kinds, all things that may perform communications will be called as the IoT terminal in the present invention. Further, the terminal using the cellular network among the IoT terminals is called the CIoT terminal. Further, for convenience of explanation, the terms of the CIoT terminal, the IoT terminal, the terminal, the user terminal, or the like may be used together. The CIoT terminal 810 may mean the terminal transmitting a small capacity of data in the LTE network. The apparatus, function, and operation for a CIoT service according to the present invention include an apparatus, a function, and an operation for small data transmission in the LTE network. The IoT data may mean a data which the IoT terminal transmits or a small capacity of data which any kind of terminals transmit.

For the CIoT, the existing network equipment may be changed. For example, a CIoT-dedicated base station may be present and a base station in which a CIoT function is added to the existing base station may be present. In the present invention, the CIoT-dedicated base station is called a C-BS 820 for convenience. The base station in which the CIoT function is added to the existing base station is called a C-eNB 825 for convenience. The present invention is not limited to the corresponding terms and therefore other terms having the equivalent technical meaning may be used. Similarly, a core network present in the cellular network may also be used only for the Clot. In the present invention, this is called a CIoT core network (CN) node 830 and is called a C-SGN in the present 3GPP, but the present invention is not limited to the corresponding term but other terms having the equivalent technical meaning may be used. The CIoT CN node 830 may not only perform context management, mobility management, and signaling session management of the CIoT terminal 810, but may also transfer the data of the terminal 810 to an application server (AS) 840 or transfer the data received from the application server 840 to the terminal 810. That is, the CIoT CN node 830 may provide functions of gateways (GWs) 865 and 867 to the CIoT terminal and perform a function of an S-GW 865/P-GW 867 of receiving a data from the C-BS 820 or the C-eNB 825 and routing the received data to the application server 840. In this case, as illustrated in FIG. 8, the CIoT CN node 830 may connect the CIoT terminal 810 to a signaling plane and may not connect the CIoT terminal to a user plane and may transmit the CIoT data to the signaling plane or may transmit a small capacity of data to the signaling plane.

Further, as illustrated in FIG. 9, when the CIoT CN node 830 establishes both of the connection of the CIoT terminal 810 to the signaling plane and the connection of the CIoT terminal 810 to the user plane, the CIoT terminal 810 establishes a bearer for the user plane with the C-BS 820 or the C-eNB 825 and the C-BS 820 or the C-eNB 825 establishes the bearer for the user plane with the S-GW 865/P-GW 867. In this case, the Clot terminal 810 may transmit the user plane data through the C-BS 820 or the C-eNB 825 and the C-BS 820 or the C-eNB 825 routes the user plane data to the S-GW 865/P-GW 867 to support data communication.

The CIoT CN node 830 performs a similar role to the MME 860 of the existing LTE network. According to the embodiment, the CIoT CN node 830 may be an apparatus in which the CloT function is added to the MME 860 providing the equivalent technology. The CloT CN node 830 may be connected to several C-BSs 820 and several C-eNBs 825. It is obvious that in the 3GPP, this is called an S1 connection and may be another term meaning an interface between the C-BS 820 or the C-eNB 825 and the CloT CN node 830. The C-eNB 825 is a base station that supports the CloT service but also supports a general LTE service. Therefore, the CloT terminal 810 and the general LTE terminal 817 may also be connected to the C-eNB 825 to use a communication service. On the other hand, the C-BS 820 is a base station supporting only the CloT service and therefore the general LTE terminal 817 is not connected and only the CloT terminal 810 is connected to the C-BS 820 to use a communication service. The CloT CN node 830 does not find whether the base stations 820 and 825 is the dedicated base station 820 for CloT or the general base station, recognizes that the S1 connection is established to transmit signaling or data. The CloT CN node 830 first transfers paging signaling to the C-BS 820 or the C-eNB 825 most recently connected to the terminals 810, 815, and 817 to transmit data or signaling. If the first paging signaling fails, the CloT CN node 830 transmits the paging signaling to all the base stations 820 and 825 in the area in which the terminals 810, 815, and 817 are present to transmit paging to the terminals 810, 815, and 817. In this case, the C-eNB 825 that is providing the general LTE service together receives the paging signaling notwithstanding that the paging signaling is not for the terminals 815 and 817 served by the C-eNB itself. In this case, the unnecessary paging signaling may cause the congestion in the C-eNB 825 providing the general LTE service to reduce the quality of service of the general LTE service user. Therefore, after the first paging signal fails, the CloT CN node 830 may first transmit the paging signaling to the C-BS 820 to prevent the congestion from occurring in the C-eNB 825 providing the general LTE service. For the operation as described above, when the CloT CN node 830 is SI-connected to the C-BS 820 or the C-eNB 820, the base station may differentiate and notify its own capability, such that it is possible to differentiate whether the base station to which the CloT CN node 830 is S1-connected is the dedicated base station for CloT (C-BS) 820 or the CloT support base station (C-eNB) 825 that also provides the general service.

Hereinafter, a method for dividing a kind of Clot traffics to preferentially perform a specific traffic transmission and a method for dividing network equipment for CloT and general network equipment supporting a CloT to allow the network equipment for CloT to process more CloT related signaling will be described.

The embodiment of the present invention mainly describes the LTE system defined in the 3GPP but may be similarly applied in radio communications such as WLAN and Bluetooth. According to the present invention, a method and an apparatus for exchanging relay related information between a core network and a base station to support an UE to network relay function that is one of proximity based service (ProSe) functions for public safety and a method and an apparatus for controlling a terminal to allow a base station to support a relay function will be described.

The CloT traffic may have a low data rate, small capacity, delay tolerant, periodicity/aperiodicity (event), response required/non-required characteristics. In more detail, the data traffic performing event reports such as smoke alarm, fault alarm, power shortage alarm, and temperature alarm may transmit a small capacity of data only to an uplink, may not require a response, and does not occur all the time, but may occur only when an event is generated. The traffic may be used in the IoT service associated with public safety and therefore may have higher priority than other data traffic. Further, the data traffic performing a periodic report such as measurement of gas consumption, measurement of water consumption, and measurement of electricity consumption may transmit a small capacity of data to an uplink, receive a response to a result of the measurement report, and may be periodically generated all the time in a minute/hour/day/month/year unit. The data traffic that turns on/off a power supply of the terminal or triggers the specific operation may transmit a small capacity of data to an uplink, receive a response to operation performance through a downlink, and may be generated periodically or aperiodically. The data needs to be performed by allowing the CloT terminal to issue a command or receive the command and therefore if the data is not transferred within a predetermined time, it is much time to trigger the device to reduce the IoT service quality, such that the data traffic needs to be preferentially process over other data traffic in the network. The data traffic for updating software/firmware, updating a set value, etc. of the IoT terminal may use the relatively large capacity as the uplink and the downlink and is the data traffic that relatively intermittently occurs. The data traffic may be used to update the security related information, update the setup for the IoT equipment added within the IoT approach network, etc.

The embodiment of the present invention proposes data traffic categorization. In this case, the CloT terminal and the network may apply other priorities depending on the data traffic category to process the IoT data. The data traffic category may be divided according to the above-mentioned data characteristics. The following Table 10 is an example showing the category depending on data traffic attributes.

TABLE 10

| Traffic property | Category |
| --- | --- |
| Data Size | Capacity that may be put in one packet, Capacity requiring at least one packet, Large capacity |
| Periodic property | Periodic (30 minutes, 1 hour, 1 day, 1 week, 1 month, 1 year, or the like) Event oriented (upon occurrence of specific situation) |
| Response required | Response required data Response non-required data |
| Public safety/Emergency | Public Safety Emergency |

The category of the above Table 10 divides data based on capacity/periodicity/response necessity/public safety/emergency and may not necessarily depend on the division as described above and mean all the categories that may be divided depending on at least one traffic attribute of capacity/periodicity/response necessity/public safety/emergency.

It may be expected that the IoT data generally has small capacity, but all the IoT data may not be transmitted by one packet and a large amount of data may be transmitted and received in the case of updating the setup of the equipment or updating the software. Therefore, it may be divided whether the IoT data may be included in one packet or several packets, or whether a large capacity of data is required. In the present invention, any division depending on the data capacity is also included.

The IoT data may be a data that is transmitted and received to and from small equipment such as a sensor or measurement equipment and the equipment may transmit a data when the measured value is periodically reported or the specific situation occurs. For example, the IoT terminal measuring water consumption and electricity consumption may transmit the measurement report in a period of 1 day, 1 week, or 1 month. When the IoT terminal that may transmit a fire alarm and an earthquake alarm senses smoke or is equal to or higher than a specific temperature or senses a strong shock, the IoT terminal may report the relevant data and thus generate a data when the specific situation occurs without periodicity. Therefore, the data traffic that the IoT terminal reports may have periodicity or may be generated as event-oriented data traffic and may be sub-divided in a unit of minute, hour, day, month, year, etc., when having periodicity.

The Iot terminal may transmit a data not requiring a response to the transmitted data. For example, when the measured value is reported, only the measured value is transmitted and the response thereto may not be required. Alternatively, the IoT terminal may transmit the data requiring the response to the data. For example, when a current temperature inside a house is queried to an air conditioner supporting the IoT service, the air conditioner receiving the query needs to respond to the current temperature. Alternatively, when the air conditioner is queried to be operated, the air conditioner may transmit the response that a command is processed well to notify a user that a command is performed well. Therefore, the data that the IoT terminal transmits may be divided depending on whether the response is required or not.

The IoT terminal may be used for a commercial purpose such as a smart home and a smart grid and a public safety/emergency purpose for perceiving a natural disaster or an accident. For example, when a fire or an earthquake occurs in sparsely settled regions, a small IoT terminal installed therearound may sense a situation to transmit a report. When the situation in which the public safety is threatened occurs, the processing thereon needs to be more quickly performed than other data. Therefore, if the IoT terminal transmits the data traffic for the public safety or the emergency, the IoT terminal may designate the traffic category so that the data traffic is preferentially processed over the general commercial data traffic. The present invention includes dividing the characteristics of the IoT terminal by using at least one of the listed attributes (capacity/periodicity/response necessity/public safety/emergency). Further, the present invention includes processing meeting the characteristics in the network based on the divided characteristics.

Meanwhile, the traffic characteristics may e interpreted as the priority of the IoT data that the IoT terminal transmits. That is, the data for the emergency or the public data needs to be preferentially processed over the general measurement report data. Therefore, the traffic characteristics may be substituted into the priority of the data and then applied. For example, the QCI value may be allocated to each kind of data by using a QoS class identifier (QCI) that is an index representing the QoS, thereby applying the priority. As a more detailed example, QCI=6 may be allocated to the data for the public safety and QCI=9 may be allocated to the general measurement report data. The terminal may transmit data including the QCI value and the base station, the MME, or the SGSN perceiving the data preferentially processes data for QCI=6 over data for QCI=9, thereby applying the priority.

Figure 10:
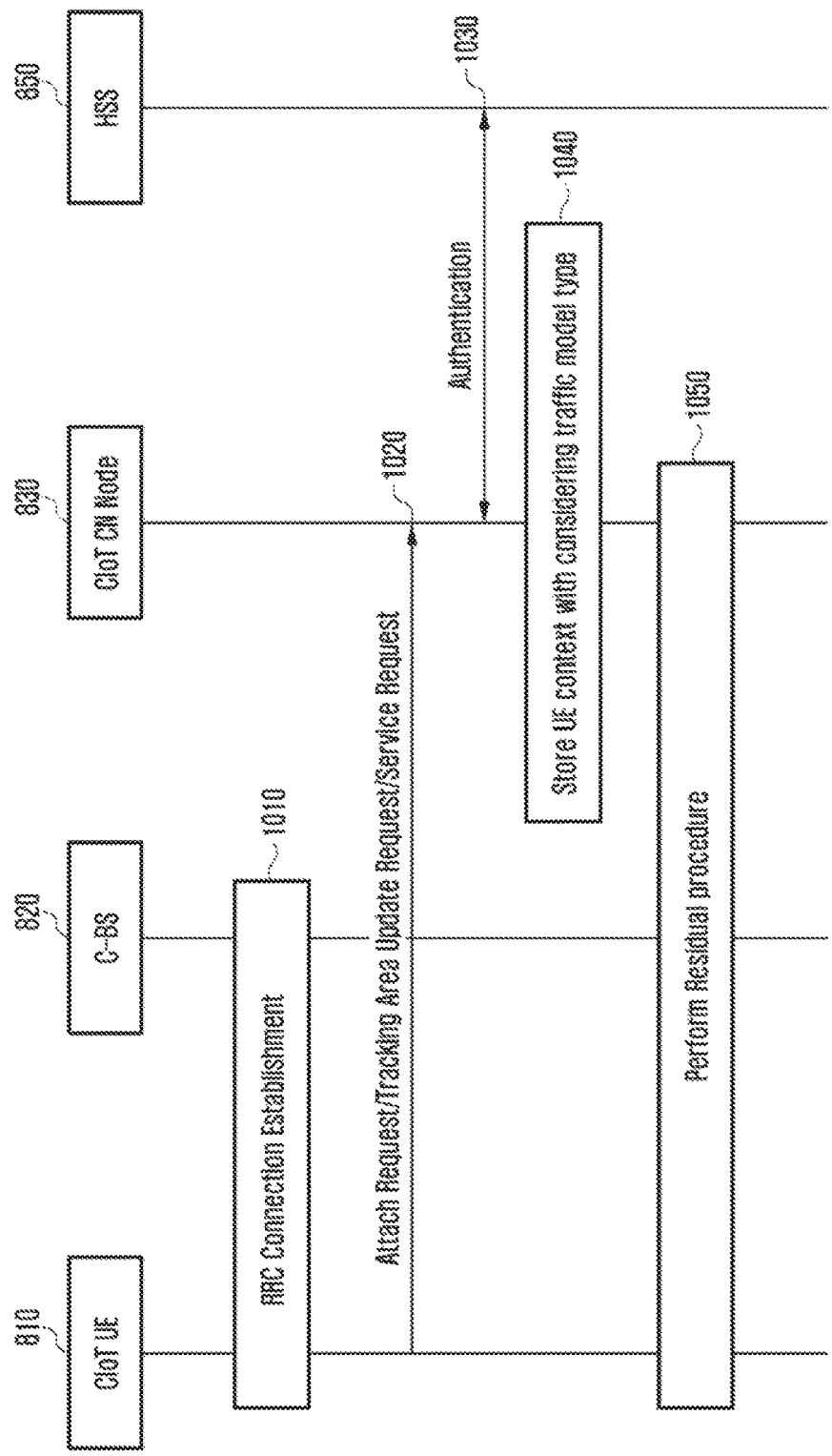
FIG. 10 is a diagram illustrating a procedure of allowing a CIoT CN node to acquire subscription information including a type dividing data traffic according to purpose or characteristics of the CIoT terminal from HSS when a CIoT terminal performs an attach/tracking area update/service request, according to an embodiment of the present invention.

FIG. 10 is a diagram illustrating a procedure of allowing a CloT CN node to acquire subscription information including a type dividing data traffic according to purpose or characteristics of the CloT terminal from HSS when a CloT terminal performs an attach/tracking area update/service request, according to an embodiment of the present invention.

According to the embodiment illustrated in FIG. 10, the data traffic category may be used in the network while being stored as subscription information of a CloT terminal 810.

In step 1010, an RRC connection between the CloT terminal 810 and the C-BS 820 may be established.

Further, in step 1020, the CloT terminal 810 may transmit an attach request to be connected to the CloT CN node 820. Alternatively, the position of the CloT terminal 810 is changed and thus the CloT terminal 810 may transmit a tracking area update to the CloT CN node 820. Alternatively, the CloT terminal 810 may transmit a service request to transmit data to the CloT CN node 820.

Further, in step 1030, the CloT CN node 820 may perform an authentication procedure on the HSS 350. In this case, the CloT CN node 820 may receive the subscription information including the division according to the data traffic characteristics used by the CloT terminal 810 from the HS S 850. Further, the CloT CN node 820 may store, as a terminal context in step 1040, the subscription information including the division according to the data traffic characteristics received in the step 1030 and used by the CloT terminal 810. Further, in step 1050, the CloT CN node 820 and the CloT terminal 810 may perform the remaining procedure.

The division according to the data traffic characteristics used by the CloT terminal 810 may be the terminal context divided into the data traffic divided according to the purpose or characteristics of the terminal and may be a terminal context divided according to the data traffic characteristics mainly used by the terminal 810. The terminal context may be present as an identifier like a type, the type may represent the type of the data traffic or the type of the CloT terminal, and the type of the CloT terminal may mean the data traffic characteristics. Alternatively, a priority value that the terminal 810 may use may be represented. For example, the terminal context may include a list of QCI values. The terminal 810 for the public safety uses a value corresponding to the highest priority, and therefore may transfer the terminal context including the value corresponding to the highest priority or the QCI value. Further, the terminal 810 performing the measurement function may be subscribed to use a value corresponding to low priority. In this case, the CloT CN node 830 may include the priority value or the QCI value corresponding thereto. The terminal 810 that may transmit various kinds of traffics needs to be able to differentiate priority for each message, and therefore the CloT CN node 830 may include the priority values or the QCI values that may be used by the corresponding terminal 810.

The CloT CN node 830 may provide different service levels for each terminal context based on the terminal context. For example, the public safety IoT terminal 810 may be authenticated by acknowledging that the terminal 810 is for the public safety when being connected to the network and may process the traffic of the corresponding terminal 81—after performing the procedure based on the priority. As another example, the terminal 810 for measuring gas consumption may include the information on the data traffic characteristics periodically reporting the measured value to the subscription information when it is connected to the network and always allocate priority corresponding to the periodic report data traffic to the terminal 810 for measuring gas consumption based on the information. As another example, the user may use the CloT support home appliances configuring the smart home using the IoT, in more detail, an air conditioner supporting the CloT function for the device trigger, and therefore the event-oriented data traffic characteristics may be found. Further, since the immediate triggering determines the quality of service, the air conditioner needs to be processed with higher priority than the terminal having the periodic data characteristics, such that the air conditioner may be processed with the corresponding priority, including the subscription information having the information on the event-oriented data traffic characteristics. The priority processing proposed in the present invention may be priority considered together with the normal LTE traffic and may be priority considered between the CIoT traffics.

Further, the priority value or the list of the priority values stored in terminal context for the terminal 810 to use in the IoT data may be transferred to the terminal 810 through a non-access stratum (NAS) procedure (for example, attach, TAU, service request) of the terminal 810.

Figure 11:
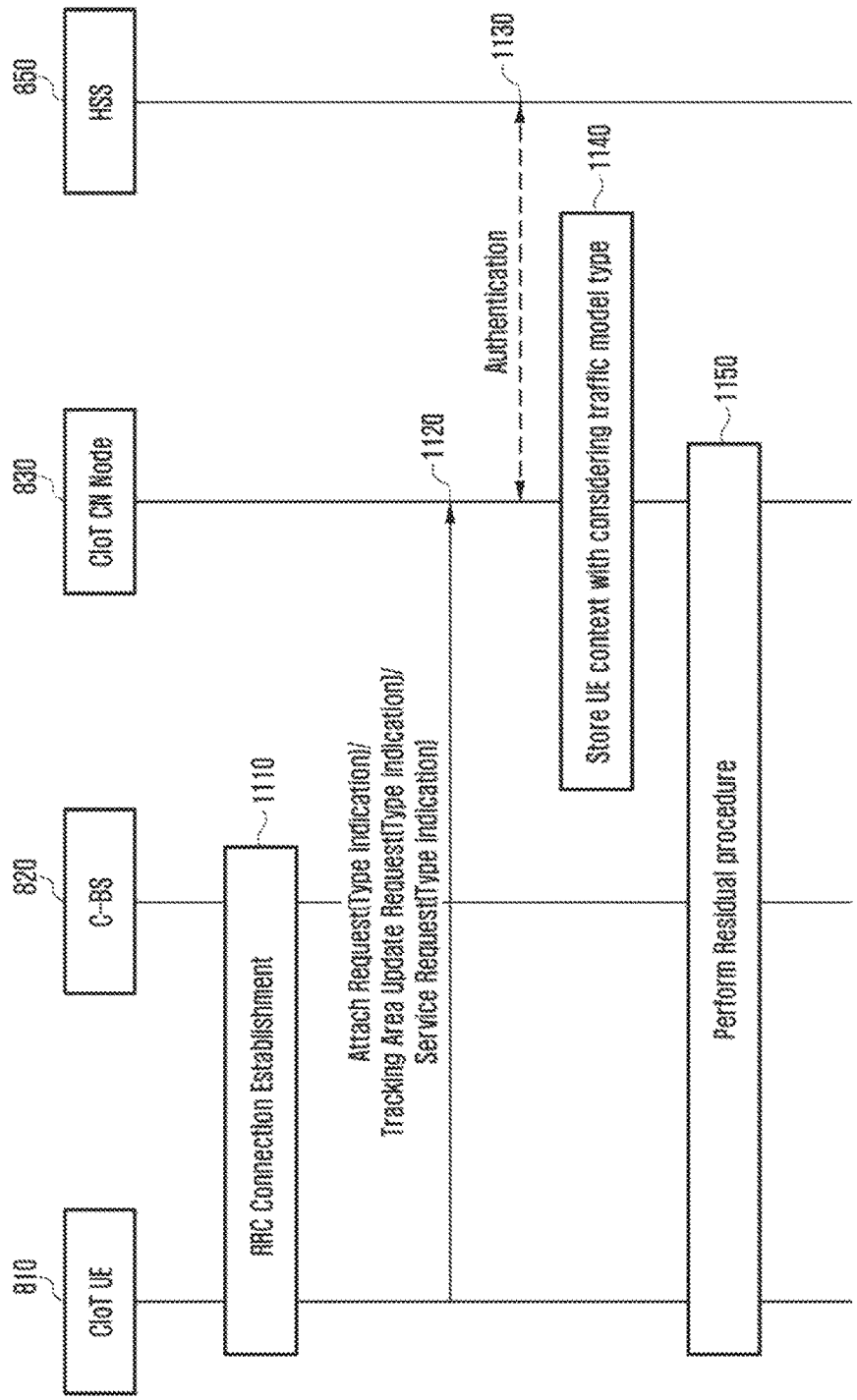
FIG. 11 is a diagram illustrating a procedure of allowing a CIoT terminal to transmit a type according to a traffic model or the purpose/characteristics of the CIoT terminal when the CIoT terminal performs the attach/tracking area update/service request, according to an embodiment of the present invention.

FIG. 11 is a diagram illustrating a procedure of allocating a CIoT terminal to transmit a type according to a traffic model or the purpose/characteristics of the CIoT terminal when the CIoT terminal performs the attach/tracking area update/service request, according to an embodiment of the present invention.

FIG. 11 illustrates an example in which the embodiment described with reference to FIG. 10 is added. That is, in step 1110, an RRC connection between the CIoT terminal 810 and the C-BS 820 may be established. Further, when the CIoT terminal 810 transmits the attach request, the tracking area update, the service request message to the CIoT CN node 830 in step 1120, the message may include an identifier meaning the division according to the data traffic characteristics used by the CIoT terminal 810, an identifier divided by the data traffic divided according to the purpose/characteristics of the terminal, or an identifier divided according to the data traffic characteristics mainly used by the terminal. In this case, the CIoT CN node 830 may look at the identifier transmitted by the terminal to divide the data traffic characteristics used by the terminal.

The CIoT CN node 830 may authenticate the information on the identifier of the terminal 810 based on the procedure of authenticating the HSS 850 in step 1130 and may omit the procedure of authenticating the information on the identifier of the terminal 810 according to the embodiment of the present invention.

Next, the CIoT CN node 830 may store the terminal context including the identifier that may divide the traffic characteristics in step 1140 and perform the remaining procedures in step 1150. Next, the terminal 810 may look at the identifier (identifier that may divide the data traffic characteristics) stored in the terminal context to provide a service meeting the characteristics.

Figure 12:
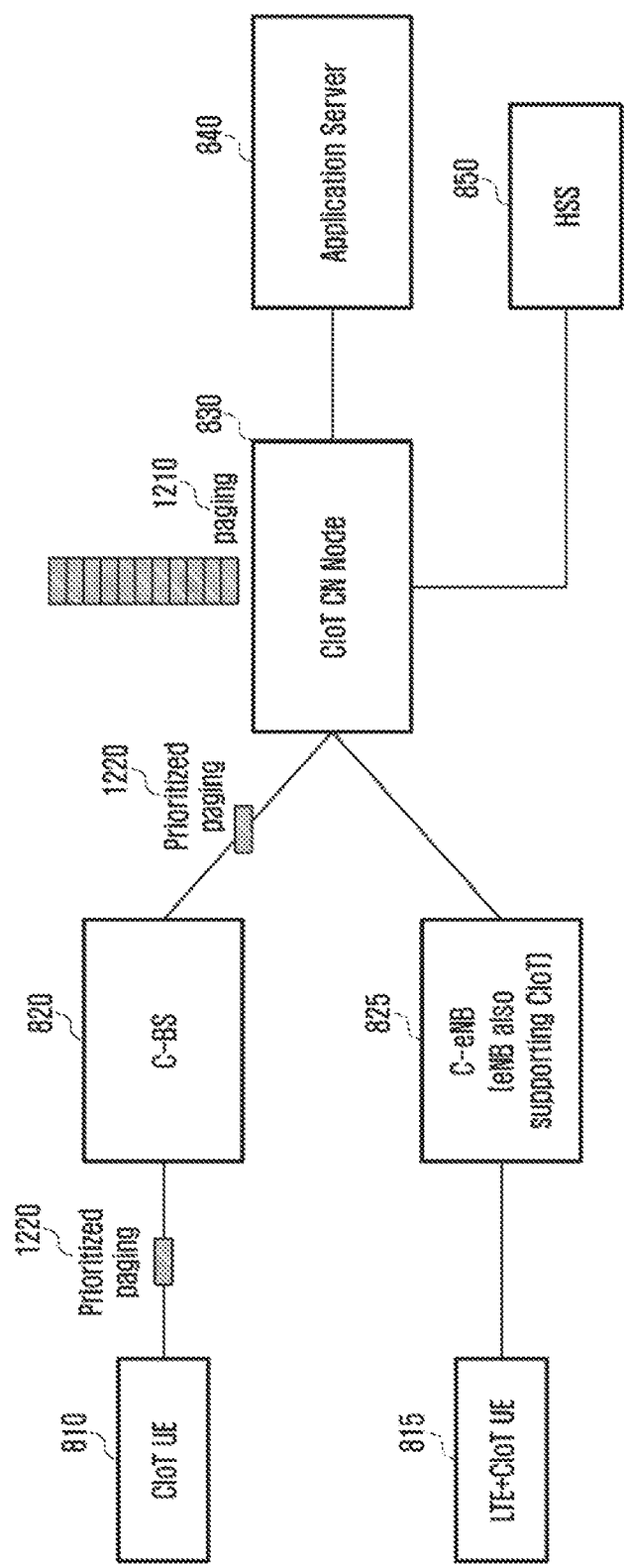
FIGS. 12 to 14 are diagrams illustrating a method and a procedure of applying priority when the CIoT terminal and a CIoT network perform paging and when the CIoT terminal and the CIoT network transfers a packet, according to an embodiment of the present invention.
Figure 13:
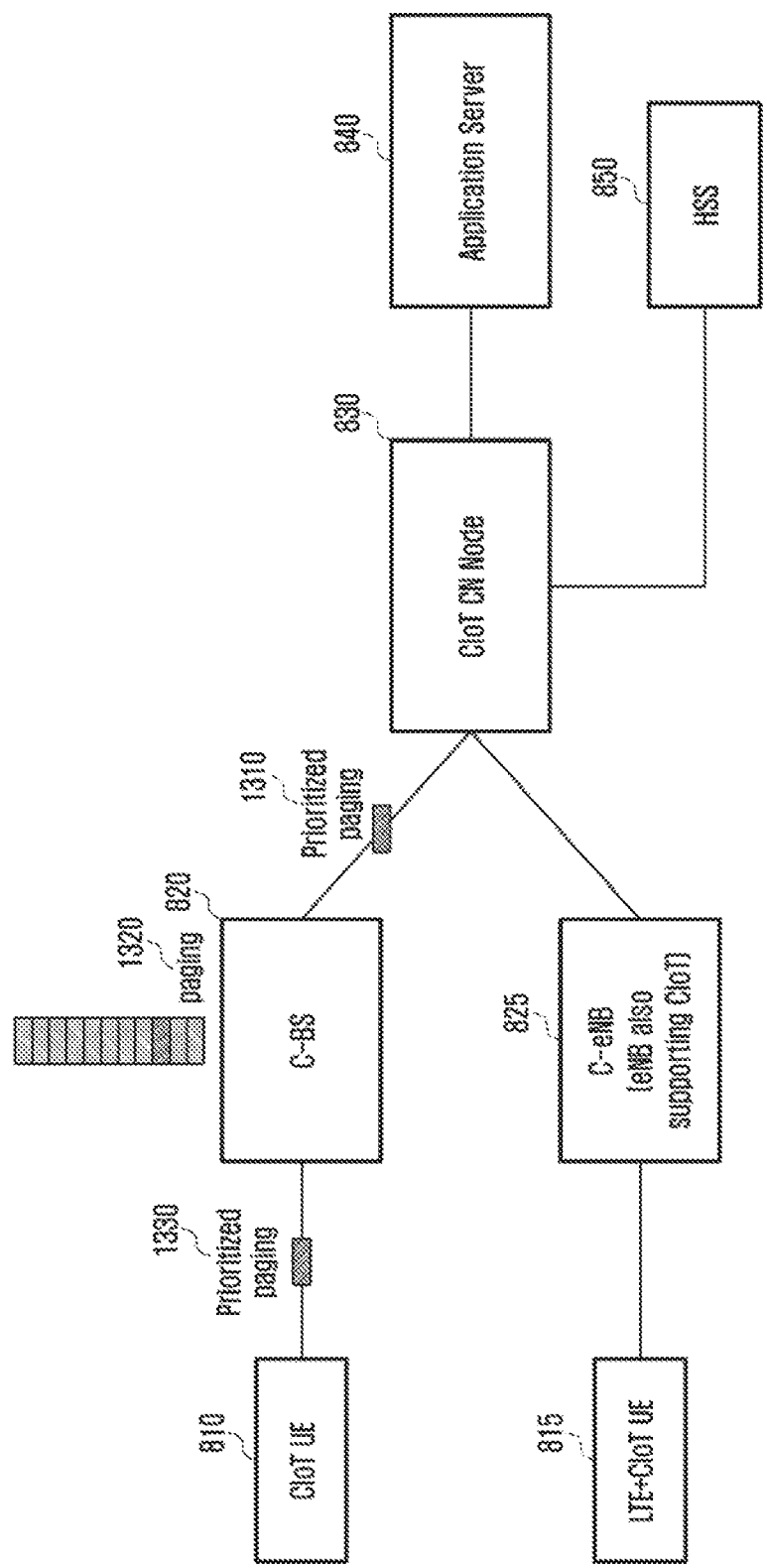
Figure 14:
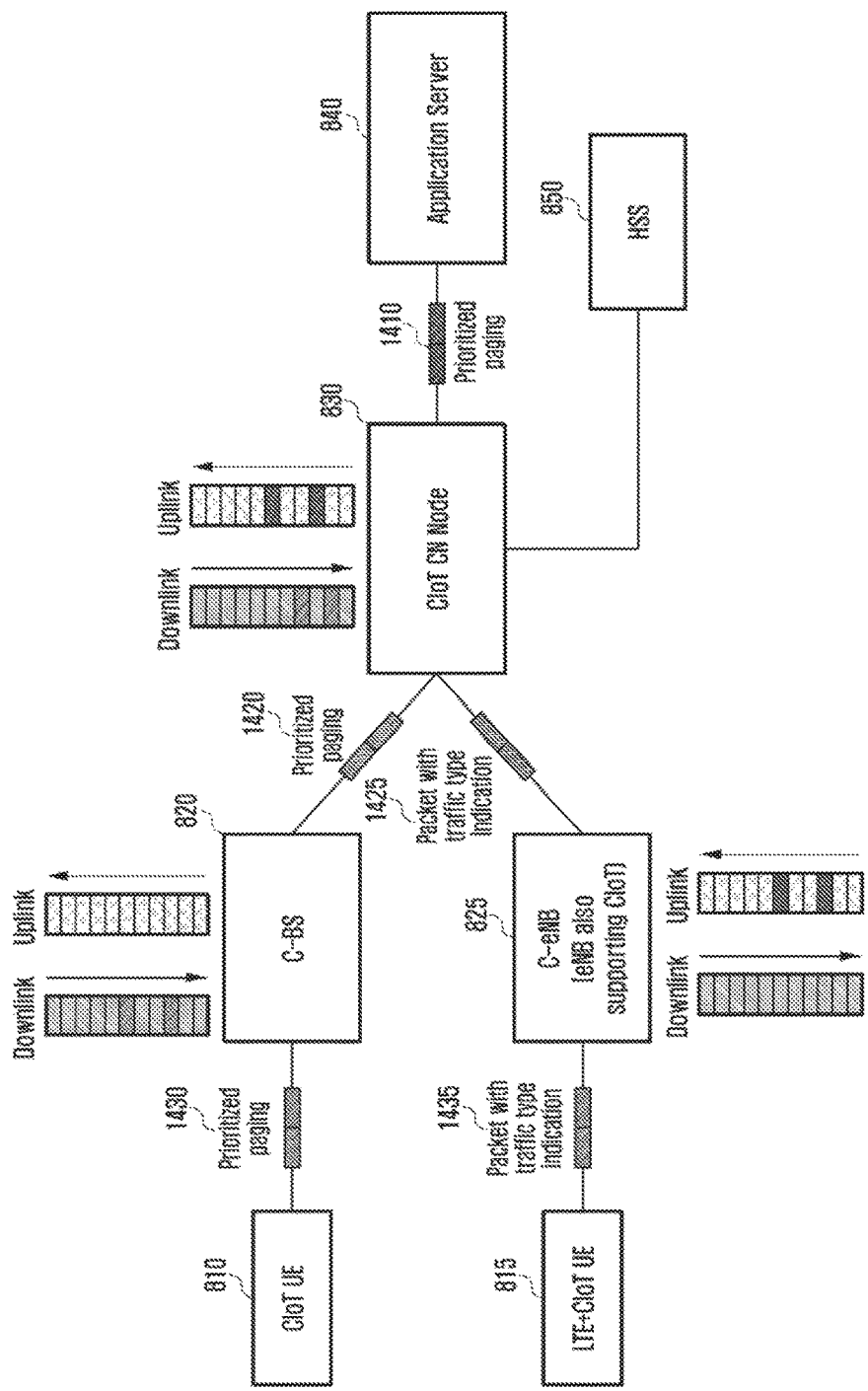

FIGS. 12 to 14 are diagrams a method and a procedure of applying priority when the CIoT terminal and a CIoT network perform paging and when the CIoT terminal and the CIoT network transfers a packet, according to an embodiment of the present invention.

The method for defining priority may follow an operator's policy operating a cellular network. For example, priority may be allocated to traffic having the event report characteristics, allocated to traffic having the public safety or emergency characteristics, or allocated to the traffic for the device trigger. Alternatively, the lowest priority may be allocated to the IoT terminal 810 having a traffic model transmitting the periodic data.

According to one described with reference to FIGS. 10 and 11, the method for applying priority illustrated in FIGS. 12 to 14 may be applied between the CIoT terminal 810 and the CIoT networks, 820, 825, 830, 840, and 850 after the CIoT CN node 830 performs the procedure of storing a terminal context.

Referring to FIG. 12, the CIoT CN node 830 determines the paging priority based on the identifier considering the data traffic attribute stored in the terminal context to transfer a paging signal processed based on priority to the C-BS 820.

Describing in more detail, when the traffic for the terminal 810 is generated from the application server 840 to transmit paging 1210 for the terminal 810, the CIoT CN node 830 may look at the terminal context to determine the identifier for the data traffic characteristics and the priority. Further, the CIoT CN node 830 may determine the paging priority based on the identifier and transmit a paging signal 1220, which is processed with priority, to the C-BS 820 or the C-eNB 825. The C-BS 820 or the C-eNB 825 may process the paging signal in the order that the paging is requested to transmit the paging signal 1220, which is processed with priority, to the CIoT terminal 810.

Referring to FIG. 13, the CIoT CN node 830 may transfer a paging message 1310 to the C-BS 820, including the identifier representing the priority in the paging request and allow the C-BS 820 to page the terminal depending on the priority included in the paging request.

Describing in more detail, the CIoT CN node 830 may include an indication representing a priority level in the paging request message 1310 transmitted to the C-BS 820 or the C-eNB 825. The C-BS 820 or the C-eNB 825 receiving the paging request message 1310 may look at the indication representing the priority level to determine the priority among different paging requests 1320. Further, when the priority of the received paging request message 1310 is ahead of different paging requests 1320, the paging may be first performed on the received paging request message 1310. According to the embodiment of the present invention, the indication representing the priority level may be represented by being divided the priority level into various levels and/or may represent only the highest priority and/or only the lowest priority.

Referring to FIG. 14, when an uplink/downlink data is transmitted between the CIoT terminal 810 and the CIoT networks 820, 825, 830, 840, and 850, the priority may be applied depending on the traffic characteristics.

Describing in more detail, the CIoT CN node 830 or the C-BS 820/C-eNB 825 may transfer a packet by applying priority to an uplink/downlink packet based on the terminal context considering the data traffic characteristics. Further, the CIoT terminals 810 and 815 may perform an uplink transmission of an indication representing the data traffic characteristics and the priority by including the indication in a packet header. The present example illustrates that the CIoT CN node 830 includes the P-GW function. However, when the P-GW is present by being separated from the CIoT CN node 830 to establish the user plane bearer, the P-GW and the S-GW may be connected to the C-BS 820 or the C-eNB 825 to transmit the packet to the user plane.

According to the present embodiment, in the case of the downlink, the CIoT CN node 830 may receive a packet 1410 from the application server 840. The CIoT CN node 830 may acknowledge to which one of CIoT UEs 810 and 815 the packet 1410 is transferred by looking at a destination IP address of a packet. Further, the CIoT CN node 830 may acknowledge the terminal context matching the IP. If the identifier for the data traffic characteristics is present in the terminal context, the priority depending on the corresponding traffic characteristics may be applied. Therefore, when packets 1420 and 1425 are transferred to the C-BS 820 or the C-eNB 825, the priority depending on the data traffic characteristics may be applied to preferentially transfer a packet for a specific user or determine the packet for the specific user as the lowest priority and transmit it. Further, the C-BS 820 or the C-eNB 825 may transmit the received packet to the terminals 810 and 815 depending on the priority.

In the case of the uplink, the CloT terminals 810 and 815 may transmit transmission packets 1430 and 1435 to the CloT CN node 830 as an NAS message. Alternatively, the CloT terminals 810 and 815 may transfer the packets 1430 and 1435 to the base station (C-BS 820 or C-eNB 825) as the RRC message and the base station (C-BS 820 or C-eNB 825) may also transfer the packets 1430 and 1435 to the CloT CN node 830 through an S1 message. Alternatively, when the user plane is established, the CloT terminals 810 and 815 may also transfer the packets 1430 and 1435 through the user plane bearer. The NAS message means a message that is transparent to the base station (C-BS 820 or C-eNB 825) and transmitted and received between the terminals 810 and 815 and the CloT CN node 830. The S1 message means a message transmitted and received between the base station (C-BS 820 or C-eNB 825) and the Clot CN node 830.

In the three methods according to the detailed embodiment of the present invention, a method for transferring, by CloT terminals 810 and 815, an uplink packet is proposed. First, when transmitting the IoT packet as the NAS message, the CloT terminals 810 and 815 may represent the data traffic characteristics in a differentiated service code point (DSCP) of a header of the NAS message or the IP packet included in the NAS message As a more detailed example of the DSCP, in the case of the data traffic transmitting the measurement report, a DSCP value having the delay tolerant and the low priority may be set. The indication of the traffic characteristics included in the header of the NAS message may be applied to the priority processing by allowing the CloT CN node 830 to receive and confirm the message. In this case, the CloT CN node 83 may compare the indication of the traffic characteristics included in the header of the NAS message with the stored terminal context to determine whether to apply the priority meeting the corresponding traffic characteristics. Alternatively, the priority may be applied as the indication of the message transmitted by the terminals 810 and 815. When the terminals 810 and 815 mark the IP packet to the DSCP and transmits the marked IP packet, the CloT CN node 830 may perform the P-GW role to open the IP packet and confirm the DSCP marking and transmit it to the application server by applying the priority based thereon. Alternatively, the terminals 810 and 815 may transfer the NAS message including the priority value of the IoT packet to the CloT CN node 830. The NAS message transmitted from the terminals 810 and 815 includes a bearer identifier and the IoT data and may further include the priority value or the QCI value of the IoT packet. In the above description, the header of the NAS message means this. The clot CN node 830 looks at the NAS message transmitted from the terminals 810 and 815 to check the priority for the corresponding traffic, thereby performing the priority processing.

Second, the terminals 810 and 815 may transmit the corresponding RRC message to the base station (C-BS 820 or C-eNB 825), including the indication meaning the data traffic characteristics in the RRC message along with the packet 1435. The indication meaning the traffic characteristics may be a value representing the priority of the traffic or the QCI value. The base stations 820 and 825 may identify the indication meaning the data traffic characteristics included in the RRC message and applies the corresponding priority to transmit it to the CloT CN node 830. The base station (C-BS 820 or C-eNB 825) configures the packet received from the terminal as the S1 message and transmits the packet to the CloT CN node. In this case, the base station may transfer the S1 message that includes an indication corresponding to the indication meaning the data traffic characteristics received from the terminals 810 and 815. The CloT CN node receiving the S1 message may apply the priority by looking at the indication included in the S1 message to transmit the packet to the application server 840 or the P-GW. The indication meaning the traffic characteristics may mean the value representing the priority of the traffic to be transmitted from the terminals 810 and 815 or the QCI value.

Next, a method for allocating priority to multimedia broadcast multicast service (MBMS) traffic in a proximity based service (ProSe) user equipment-network (UE-network) relay will be described.

According to one embodiment of the present invention, in a process of providing a relay service for MBMS traffic through the ProSe UE-network (NW) relay, a ProSe per-packet-priority (PPP) value to be applied when a packet is transmitted may be set in the ProSe UE-NW relay.

Figure 15:
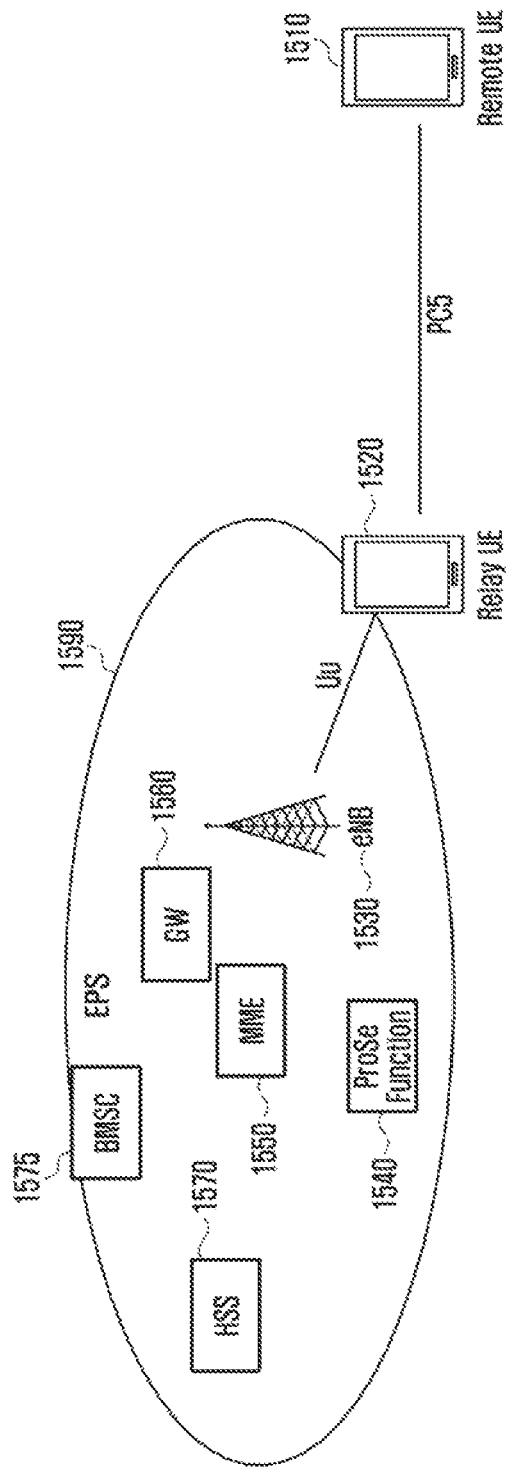
FIG. 15 is a diagram illustrating an example of a ProSe network structure.

FIG. 15 is a diagram illustrating an example of a ProSe network structure.

Referring to FIG. 15, by the proximity service between the terminal, a service may be received through a network using a ProSe UE-NW relay 1520.

The UE-NW rely UE (or relay UE) 1520 serves as a relay that transfers a service provided from a cellular network 1590 to the remote UE 1510, while being within the coverage of the base station (eNB) 1530 Meanwhile, the cellular network 1590 may include a base station 1530, a ProSe ProSe function 1540, an MME 1550, a gateway (GW) 1560, an HSS 1570, a BMSC 1575, or the like.

Meanwhile, the UE-NW relay UE 1520 may receive various kinds of information for registering that the UE-NW relay UE 1520 is a relay and providing a relay service through the EPS network 1590 or may prepare a relay service such as a generation of a PDN connection for providing an IP service to the remote UE 1510. Further, when the relay service is prepared, the UE-NW relay UE 1520 broadcasts an announcement message for directly notifying that the UE-NW relay UE 1520 is a relay according to a discovery method, such that the remote UE 1510 may discover the UE-NW relay UE 1520. Alternatively, the UE-NW relay UE 1520 receives a discovery solicitation message transmitted when a remote UE 1510 therearound finds out a relay, and if meeting the corresponding condition, the UE-NW relay UE 1520 transmits a discovery response message and thus the remote UE 1510 may also discover the UE-NW relay UE 1520. The remote UE 1510 may select the wanted relay among the discovered UE-NW relay UEs 1520 to setup the connection between the corresponding UE-NW relay UE 1520 and the remote UE 1510, such that the remote UE 1510 may receive a service through the cellular network 1590.

In this case, the ProSe per-packet-priority value to be applied when the MBMS traffic is transmitted may be setup in the ProSe UE-NW relay UE 1520.

Figure 16:
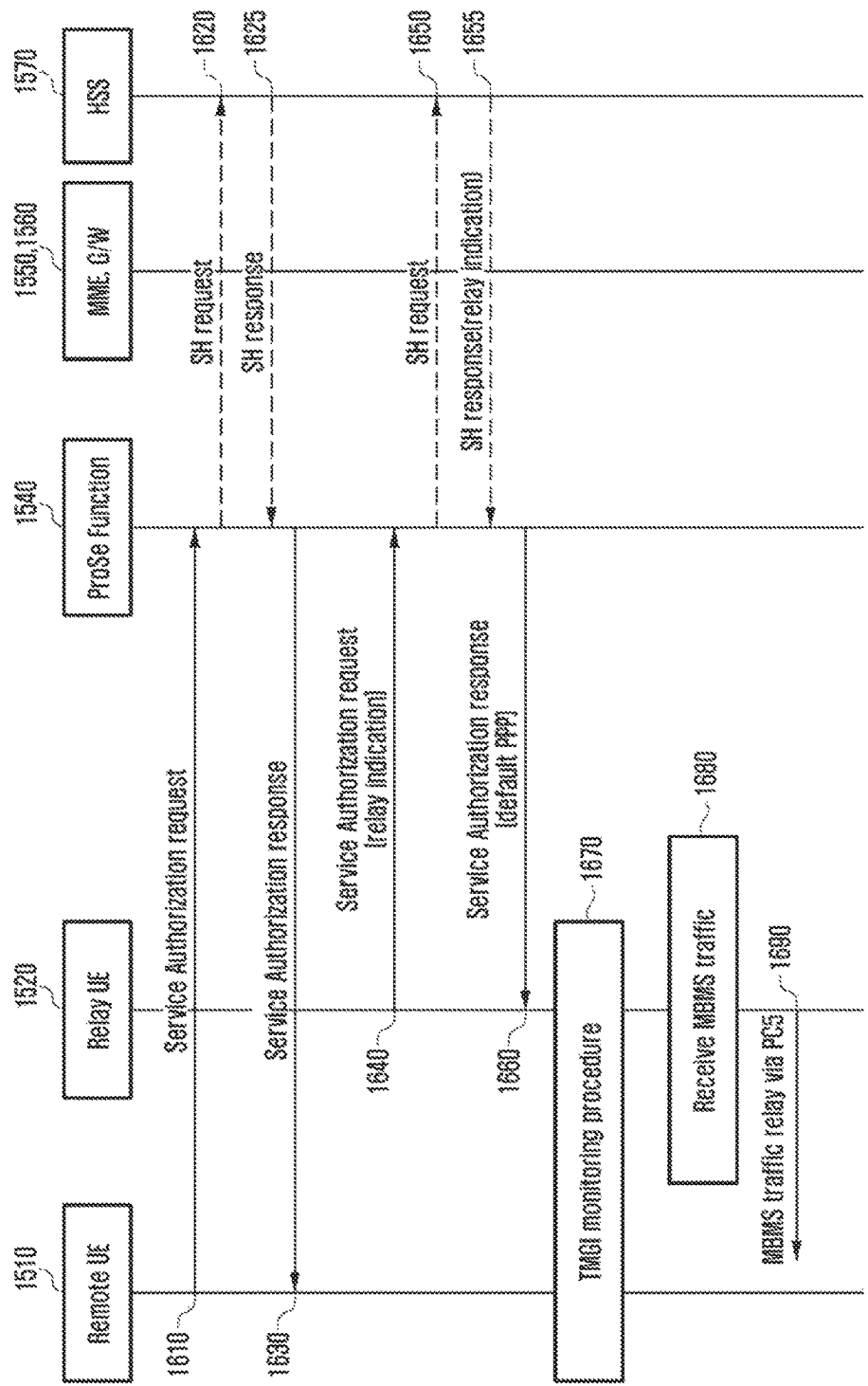
FIG. 16 is a flow chart illustrating a procedure of receiving a ProSe Per-Packet-Priority value according to an embodiment of the present invention.

FIG. 16 is a flow chart illustrating a procedure of receiving a ProSe Per-Packet-Priority value according to an embodiment of the present invention.

Referring to FIG. 16, according to the embodiment of the present invention, the relay UE 1520 may be allocated with a default PPP value in a provisioning step.

The ProSe UE-NW relay UE 1520 may perform a procedure of preparing a relay service through a service authorization process. In step 1610, the ProSe remote UE 1510 may transmit a service authorization request message to the ProSe function 1540 for the service authorization process. Further, in step 1630, the ProSe function 1540 may transmit the service authorization response message to the remote UE 1510. According to the embodiment of the present invention, the ProSe function 1540 may receive the information on the ProSe service for the remote UE 1510 from the Hss 1570 an SH request message and an SH response message of the steps 1620 and 1630, if necessary.

Meanwhile, the UE-NW relay 1520 that may provide the relay service or provides the relay service may provide the relay service or may also transmit the relay indication for indicating the terminal providing the relay service when the service authorization request message is transmitted to the ProSe function 1540 in step 1640. In this case, the ProSe function 1540 may confirm whether the terminal 1520 transmitting the service authorization request message in the step 1640 is a terminal providing the relay service based on its own information. Alternatively, the ProSe function 1540 may transmit a message (for example, SH request) querying whether the terminal 1520 transmitting the service authorization request message in the step 1640 to the HSS 1570 is a terminal providing the relay service in step 1650 and receive and confirm the response message (for example, SH response) thereto from the HSS 1570 in step 1655. In this case, in the step 1655, the HSS 1570 may transmit the SH response message including the relay indication.

Further, the ProSe function 1540 may transfer the default PPP value to be used when the UE-NW relay UE 1520 provides the relay service for the MBMS traffic to the relay UE 1520 through the service authorization response message in step 1660, depending on the value stored in the ProSe function 1540 or the value included in the message received from th HSS 240 in the step 1655. According to the embodiment of the present invention, the default PPP value may be allocated to the relay UE 1520 through a 3rd party application server, in addition to the ProSe function 1540 or the HSS 1570.

Meanwhile, in step 1670, the remote UE 1510 notifies the relay UE 1520 of the wanted TMGI information when receiving the MBMS traffic to request monitoring the MBMS traffic for the corresponding TMGI. Further, the requested relay UE 1520 transfers ProSe L2 group ID_traffic indicating a ProSe group to be used to transmit the MBMS traffic corresponding to the TMGI to the remote UE 1510 as a response to the request. Further, in step 1680, the relay UE 1520 may receive the MBMS traffic for the TMGI. In this case, the relay UE 1520 broadcasts the corresponding MBMS traffic to the ProSe L2 group ID_traffic through a PC5 interface depending on the default PPP value allocated from the ProSe function 1540 in step 1690.

According to another embodiment of the present invention, when broadcasting the MBMS traffic to the ProSe L2 group ID_traffic, the relay UE 1520 refers to the default PPP value and the number of remote UEs 1510 requesting the TMGI monitoring to the relay UE to define the per-packet-priority (PPP) value, thereby transmitting the traffic. For example, when the default PPP value is 3 and the terminal requesting the TMGI monitoring is one, the PPP value is set to be 3, while when the terminal requesting the TMGI monitoring is equal to or more than 5, a higher PPP value may be set to be 2 to transmit traffic.

Figure 17:
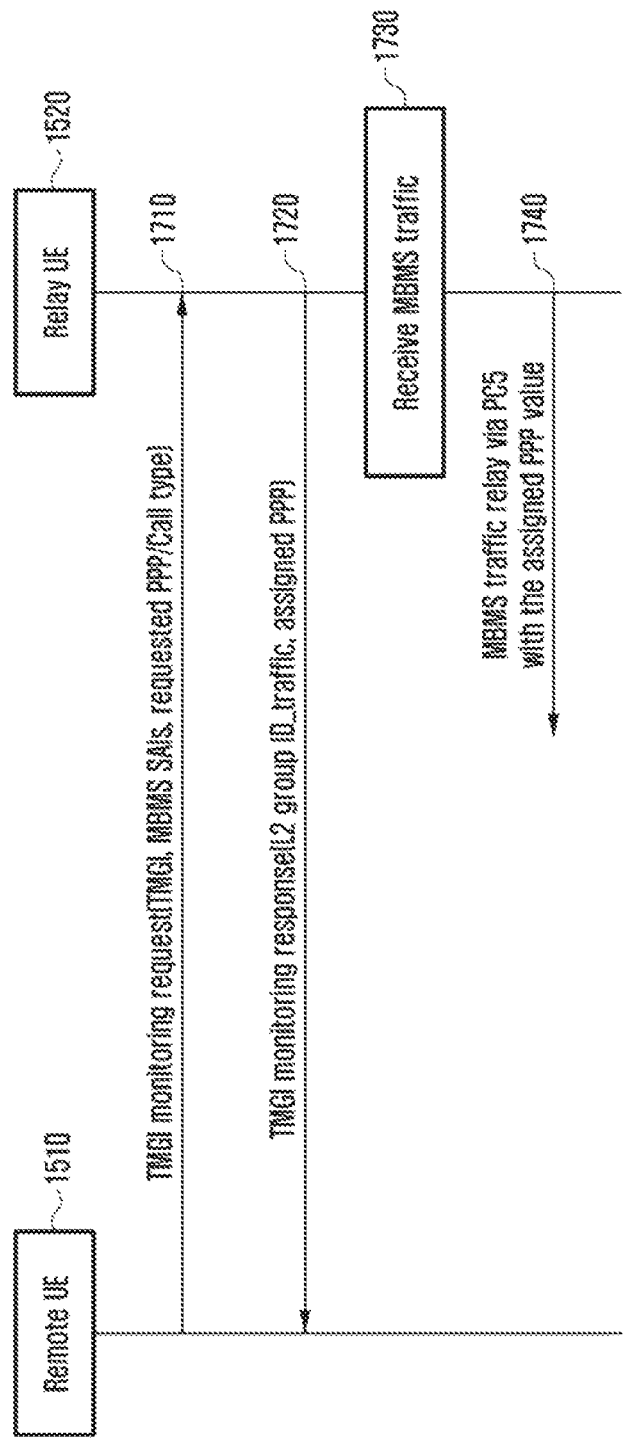
FIG. 17 is a flow chart illustrating a procedure of receiving PPP information through a remote terminal.

FIG. 17 is a flow chart illustrating a procedure of receiving PPP information through a remote terminal.

Referring to FIG. 17, according to the embodiment of the present invention, the relay UE 1520 may receive the ProSe per packet priority (PPP) information through the remote UE 1510.

The remote UE 1510 accesses the UE-NW relay UE 1520 and then in step 1710, may request the TMGI monitoring to transmit the TMGI monitoring request message for requesting the MBMS traffic transmission corresponding to a specific TMGI to the relay UE 1520. In this case, the TMGI monitoring request message transfers the TMGI and MBMS service area identities (SAIs) and the per packet priority (PPP) related information on the MBMS traffic acquired from an application layer of the remote UE 1510 itself to the relay UE 1520. That is, the remote UE 1510 may transmit information on priority that the remote UE 1510 wants to receive to the relay UE 1520.

Describing in more detail, the application layer of the remote UE 1510 may determine the ProSe PPP related information. In this case, the application layer of the remote UE 1510 may determine the PPP related information associated with the specific TMGI that the remote UE 1510 requests. Further, the application layer that is an upper layer of the remote UE 1510 may transmit the determined PPP related information to the ProSe layer. Accordingly, the ProSe layer of the remote UE 1510 may transmit the PPP value, which is received from the application layer and included in the TMGI monitoring request message, to the relay UE 1520.

As the PPP related information, the PPP value allocated from the application layer of the remote UE 1510, a call type (for example, information, or the like of emergency/imminent peril/normal) for the corresponding service, or the like may be used.

The relay UE 1520 determines the PPP value to be actually used based on the information. When the relay UE 1520 has the existing PPP value for the corresponding TMGI, the relay UE 1520 disregards the existing PPP value and may substitute the existing PPP value into a new PPP value. Alternatively, the case in which the relay UE 1520 discards the new PPP value and continuously uses the existing PPP value may be possible.

Further, in step 1720, the relay UE 1520 may transmit the TMGI monitoring response message to the remote UE 1510. In this case, the relay UE 1520 may also transmit the L2 Group ID_traffic that is the allocated ProSe group information and according to the embodiment of the present invention, may also transmit the PPP value to be used to the remote UE 1510 by including the PPP value in the TMGI monitoring response message. According to the embodiment of the present invention, the PPP value to be used is not included in the TMGI monitoring response message and may be referenced only upon the transmission of the MBMS traffic later.

Further, if the relay UE 1520 receives the MBMS traffic in step 1730, in step 1740, the relay UE 1520 relays the received MBMS traffic to be transmitted to a PC5 interface using the PPP value.

Next, a method for providing QoS in an EPS network for traffic transmitted through a ProSE UE-network relay will be described.

According to the embodiment of the present invention, the EPS bearer may be modified or the EPS bearer may generated to provide an appropriate QoS in an EPS network to the remote UE receiving an EPS network service through the ProSe UE-NW relay may be provided.

Figure 18:
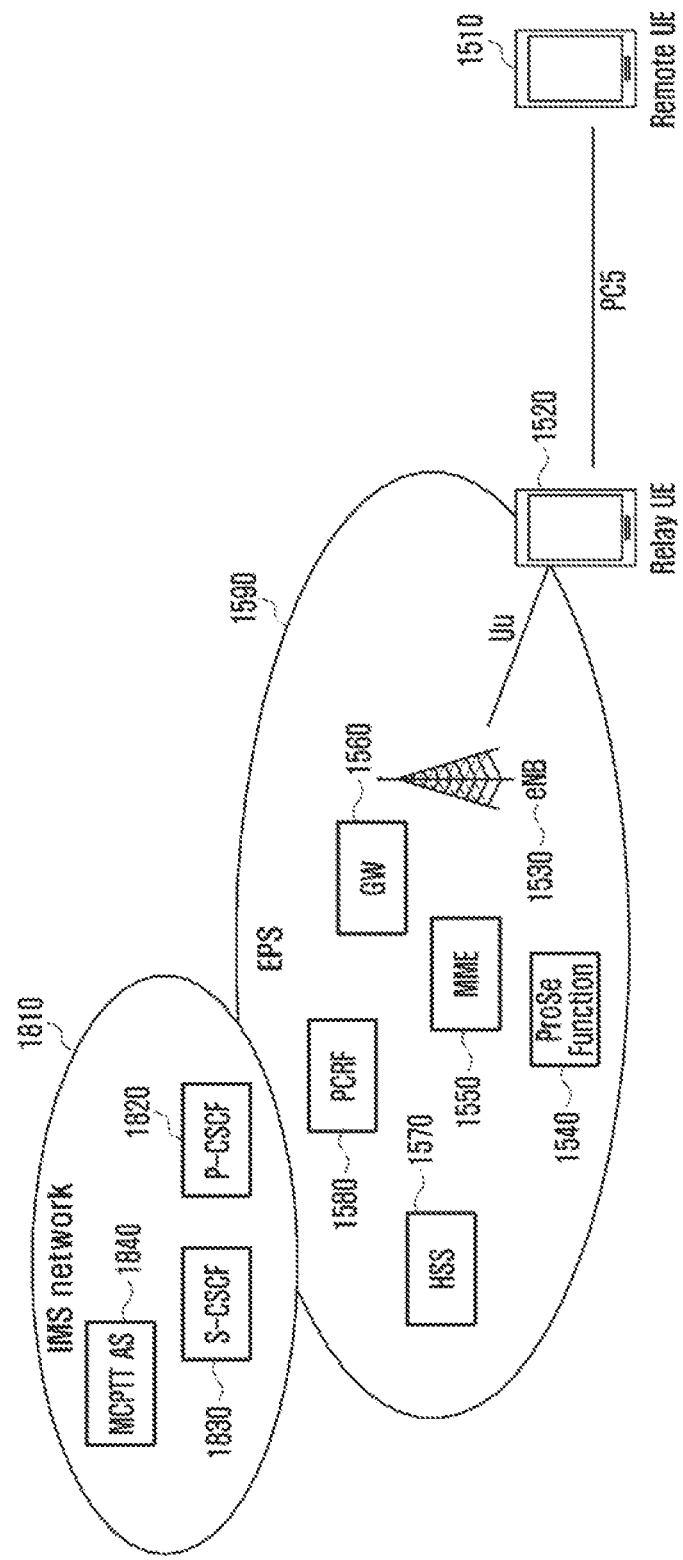
FIG. 18 is a diagram illustrating an example of a ProSe network structure and an EPS and IMS network structure.

FIG. 18 is a diagram illustrating an example of a ProSe network structure and an EPS and IMS network structure.

Referring to FIG. 18, by the proximity service between the terminals, an IMS service may be received through the EPS network using the ProSe UE-NW relay 1520.

If the ProSe UE-NW relay UE 1520 is within the coverage of the base station eNB 1530, the ProSe UE-NW relay UE 1520 serves as the relay role of transferring the service provided from the cellular network 1590 to the remote UE 1510. Meanwhile, the cellular network 1590 may include the base station 1530, the ProSe ProSe function 1540, the MME 1550, the gateway (GW) 1560, the HSS 1570, the PCRF 1580, or the like. Further, an IMS network 1810 may include a P-CSCF 1820, an S-CSCF 1830, an MCPTT AS 1840, or the like.

Meanwhile, the UE-NW relay UE 1520 may receive various kinds of information for registering that the UE-NW relay UE 1520 is the relay and providing the relay service through the EPS network 1590 or may prepare the relay service such as the generation of the PDN connection for providing the IP service to the remote UE 1510. Further, when the relay service is prepared, the UE-NW relay UE 1520 broadcasts the announcement message for directly notifying that the UE-NW relay UE 1520 is the relay according to the discovery method, such that the remote UE 1510 may discover the UE-NW relay UE 1520. Alternatively, the UE-NW relay UE 1520 receives the discovery solicitation message transmitted when the remote UE 1510 therearound finds out the relay, and if meeting the corresponding condition, the UE-NW relay UE 1520 transmits the discovery response message and thus the remote UE 1510 may also discover the UE-NW relay UE 1520. The remote UE 1510 may select the wanted relay among the discovered UE-NW relay UEs 1520 to setup the connection between the corresponding UE-NW relay UE 1520 and the remote UE 1510, such that the remote UE 1510 may receive a service through the network.

The remote UE 1510 may receive the MCPTT services such as voice communication and image communication through the IMS network 1810 by the connection. By the way, the allocation of resources to the relay UE 1520 in the EPS network 1590 is made between the GW 1560 and the relay UE 1520 and the remote UE 1510 receives a service using the resources. Therefore, a method for providing an appropriate QoS between a GW and a relay UE 1520 is required.

Therefore, to provide the appropriate QoS within the EPS network 1590 to the remote UE 1510 receiving the EPS network 1590 service through the ProSe UE-NW relay 1520, a method for modifying or generating an EPS bearer will be described in detail.

Figure 19:
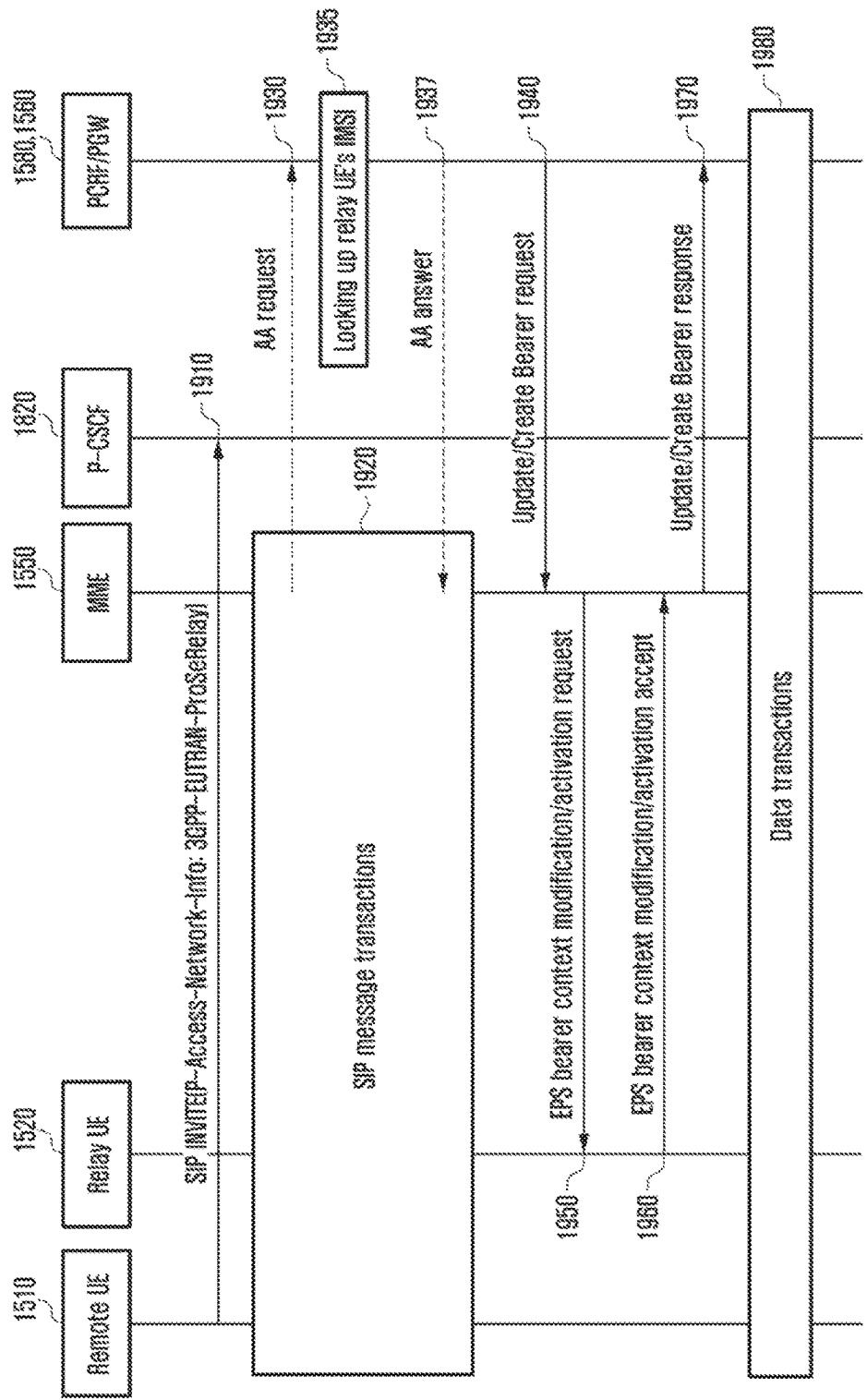
FIG. 19 is a flow chart of allocating an appropriate QoS to an EPS bearer for a relay through a PCRF.

FIG. 19 is a flow chart of allocating an appropriate QoS to an EPS bearer for a relay through a PCRF.

Referring to FIG. 19, according to the embodiment of the present invention, the appropriate QoS may be allocated to the EPS bearer for the purpose of the relay through the PCRF 1580.

For the IMS service, the remote UE 1510 may transmit the SIP message to the P-CSCF 1820 in step 1910. In this case, the remote UE 1510 sets an access type of a P-Access-Network-Info header field of an SIP header as 3GPP-EUTRAN-ProSeRelay or 3GPP-EUTRAN-Pro SeUNR to notify the P-CSCF 1820 that it accesses the IMS network through the ProSe relay. Of course, the method for notifying the access situation to the IMS network through the ProSe relay may also notify the access through the ProSeRelay using a separate field in addition to the access type. The SIP message transmitted from the remote UE 1510 includes SIP registration, SIP invite, SIP update, SIP 200OK, etc.

Here, for convenience of explanation, the SIP invite message will be described as an example.

In step 1910, if the P-CSCF 1820 receiving the SIP INVITE recognizes the access through the ProSe relay, the P-CSCF 1820 may track and find the PCRF 1580 allocating a PCC rule from the source IP address of the IP packet receiving the SIP invite to the relay UE 1520. Further, the P-CSCF 1820 may transmit an AA request to the found PCRF 1580 in step 1930 to transmit information on features of a call flow based on an SDP transferred along with the SIP message. In this case, the AA request includes the IP address of the relay UE 1520 found from the source IP address instead of a subscription ID value and a field notifying that the AA request is a terminal through the ProSe relay may be inserted. In step 1935, the PCRF 1580 receiving the AA request tracks and finds out the IMSI value of the relay UE 1520 based on the corresponding IP address. In this case, according to the embodiment of the present invention, the PCRF 1580 may also interwork with the PGW 1560 to track an IMSI value of the relay UE 1520.

As the response thereto, the PCRF 1580 may transfer the AA answer to the P-CSCF 1820 in step 1937. Further, the PCRF 1580 may generate the PCC rule according to the features of the call flow obtained from the AA request and transfer the generated PCC rule to the PGW 1560. Further, when the PGW 1560 changes the QoS allocated to the existing EPS bearer according to the PCC rule, in step 1940, the PGW 1560 may transmit the update bearer request to the MME 1550. Further, when the PGW 1560 generates the separate EPS bearer according to the PCC rule, in step 1940, the PGW 1560 may transmit the create bearer request to the MME 1550. As a result, the MME 1550 may perform an EPS bearer context modification process or a dedicated EPS bearer context activation process together with the relay UE 1520 in the steps 1950 and 1960. Further, the MME 1550 may transfer the update bearer response or create bearer response message as the response thereto to the PGW 1560 in the step 1970. Consequently, the remote UE 1510 transmits data transmitted and received to and from the relay UE 1520 and the ProSe through the EPS network using the modified or generated EPS bearer in step 1980.

According to another embodiment of the present invention, if the P-CSCF 1820 receiving the SIP INVITE message recognizes the access through the ProSe relay in the step 1910, the P-CSCF 1820 recognizes that it is impossible to generate the PCC rule for providing the features of the call flow proposed in the SDP included in the SIP message through the AA request and thus may also be operated not to perform the AA request process at all. In this case, the PCRF 1580 may not perform the EPS bearer modification or the EPS bearer activation that is triggered.

Figure 20:
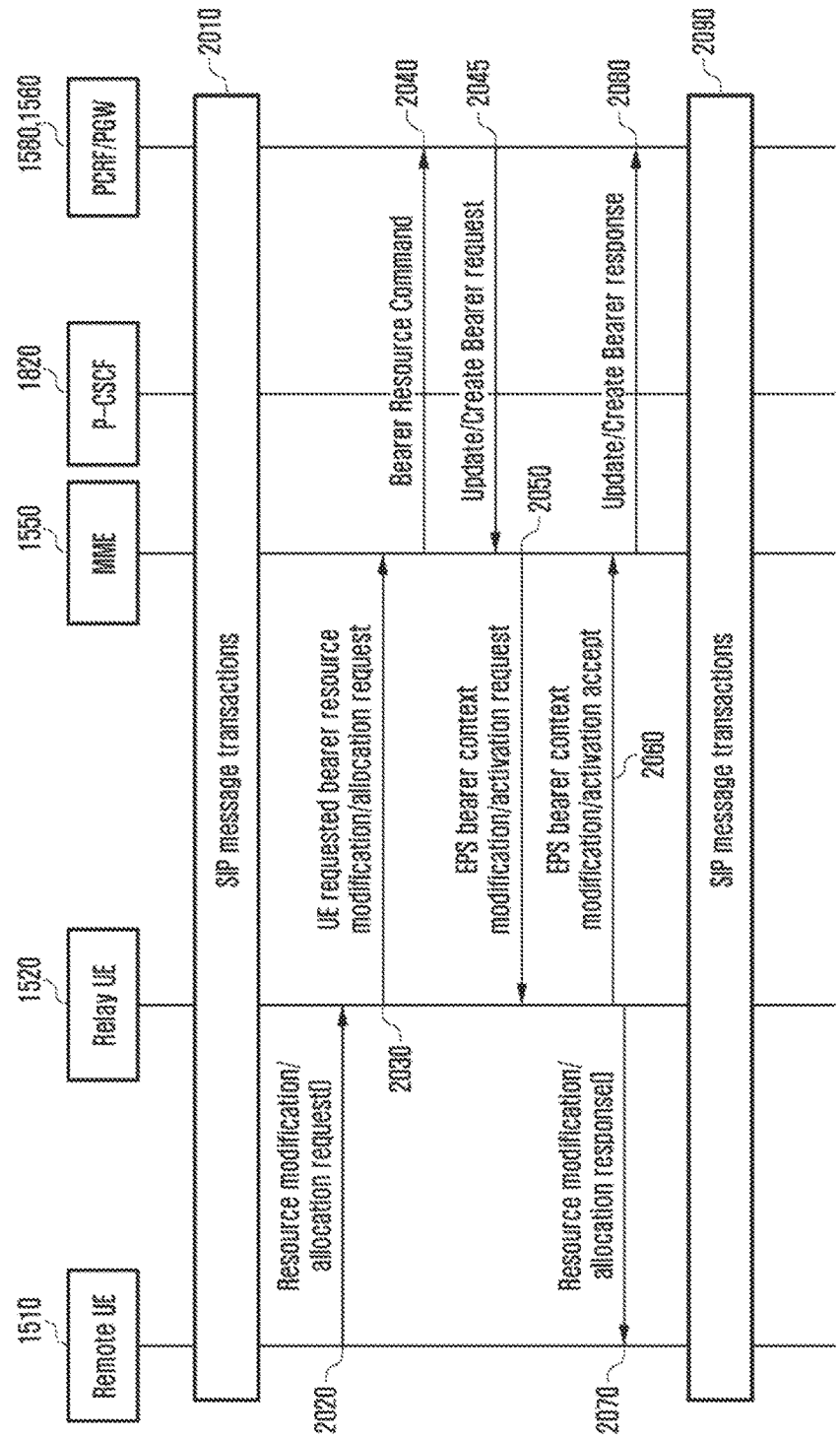
FIG. 20 is a diagram illustrating a procedure of allowing a remote terminal to request an appropriate QoS to an EPS bearer for a relay and allocating the QoS to the remote terminal.

FIG. 20 is a diagram illustrating a procedure of allowing a remote terminal to request an appropriate QoS to an EPS bearer for a relay and allocating the QoS to the remote terminal.

Referring to FIG. 20, according to the embodiment of the present invention, the remote UE 1510 may directly request the appropriate QoS to the EPS bearer for the purpose of the relay and may be allocated with the requested QoS.

When transmitting the SIP message for the IMS service, the remote UE 1510 sets the access type of the P-Access-Network-Info header field of the SIP header as the 3GPP-EUTRAN-ProSeRelay or the 3GPP-EUTRAN-ProSeUNR to notify the state in which the remote UE 1510 accesses the IMS network through the ProSe relay and recognizes that it is impossible to modify and generate the EPS bearer through the PCRF 1580 as the response thereto or identically sets the access type with the normal access like the 3GPP-EU-TRAN-FDD or the 3GPP-EUTRAN-TDD without notifying that it is the IMS access through the ProSe relay using the SIP message, but when the fact that it is impossible to modify and generate the EPS bearer through the PCRF 1580 is known in advance, may perform the procedure for receiving the allocation of the appropriate QoS like the present invention.

When the remote UE 1510 generates or ends the IMS call, in step 2020, the remote UE 1510 may transfer a resource allocation request message or a resource modification request message to the relay UE 1520 through the PC5 interface. The message may include characteristics of the call flow to be newly added or changed.

In the step 2020, the relay UE 1520 receiving the message may transmit a UE requested bearer resource allocation request message or a UE requested bearer resource modification request message to the MME 1550 in step 2030. By doing so, the relay UE 1520 may request the change of the QoS through the EPS bearer modification or request the EPS bearer generation of the new QoS.

Therefore, the MME 1550 may transmit a bearer request command to the PGW 1560 in step 2040. Therefore, when the PGW 1560 changes the QoS allocated to the existing EPS bearer or generates the separate EPS bearer according to the PCC rule, in step 2045, the PGW 1560 may transmit the update bearer request or the create bearer request to the MME 1550. Further, the MME 1550 may perform an EPS bearer context modification process or a dedicated EPS bearer context activation process together with the relay UE 1520 in step 2050. Further, the MME 1550 may transfer the update bearer response or create bearer response message as the response thereto to the PGW 1560 in step 2080. The modification or generation of the EPS bearer will be described in detail with reference to the portion associated with FIG. 19.

Further, the relay UE 1520 may transfer a generation result to the remote UE 1510 through the PC5 interface using the resource modification response or resource allocation response message in step 2070. Consequently, the remote UE 1510 transmits data transmitted and received to and from the relay UE 1520 and the ProSe through the EPS network using the modified or generated EPS bearer in step 2090.

Meanwhile, when the access between the remote UE 1510 and the relay UE 1520 is released, the relay UE 1520 requests the UE request bearer modification or transmits the UE request bearer deactivation request to the MME 1550 as in step 2030 to modify or delete the EPS bearer, thereby effectively operating the resource.

As another embodiment of the present invention, in FIG. 20, the remote UE 1510 may not directly perform the resource modification or the resource allocation as in step 2020. Further, by considering the number of relay UEs 1520 that accesses the relay UE 1520 and the capacity of the use traffic, the relay UE 1520 may transmit the UE requested bearer resource allocation request message or the UE requested bearer resource modification request message to the MME 1550 in step 2030 to request the change of the QoS or the generation of the EPS bearer of the new QoS through the EPS bearer modification. Therefore, the EPS bearer is modified or generated by the procedure as in FIG. 20 and then as in the step 2090, the data transmitted and received between the remote UE 1510 and the relay UE 1520 using the ProSe is transmitted through the EPS bearer modified or generated by the process in the EPS network.

Meanwhile, when the access between the remote UE 1510 and the relay UE 1520 is released or the use traffic is reduced for a predetermined time, the relay UE 1520 requests the UE request bearer modification or transmits the UE request bearer deactivation request to the MME 1550 as in step 2030 to modify or delete the EPS bearer, thereby effectively operating the resource.

Next, a method for transferring positional information upon an IMS network through a ProSe UE-network relay will be described.

According to the embodiment of the present invention, to acquire the tracking area code (TAC) and the EUTRAN cell identifier (ECI) included in the P-access-network-info header field of the SIP message header, the remote UE accessing the MIS network through the ProSe UE-network relay acquires the relevant information through the relay UE or processes the TAC or ECI value as a meaningless value introduces to normally provide the IMS service.

Referring to FIG. 18, the remote UE 1510 may receive the MCPTT services such as the voice communication and the image communication through the IMS network 1810. By the way, when accessing the IMS network 1810 through the EPS network 1590, the P-Access-Network-Info header field of the SIP header may include the positional information, that is, the MCC and MNC information, the tracking area code (TAC) information, and the EUTRAN cell ID (ECI) information, or the like.

However, the remote UE 1510 does not directly access the eNB 1530 but accesses the network through the relay UE, thereby removing the TAC information and the ECI information. Therefore, to normally receive the IMS service, a method for acquiring TAC information and ECI information is required.

Figure 21:
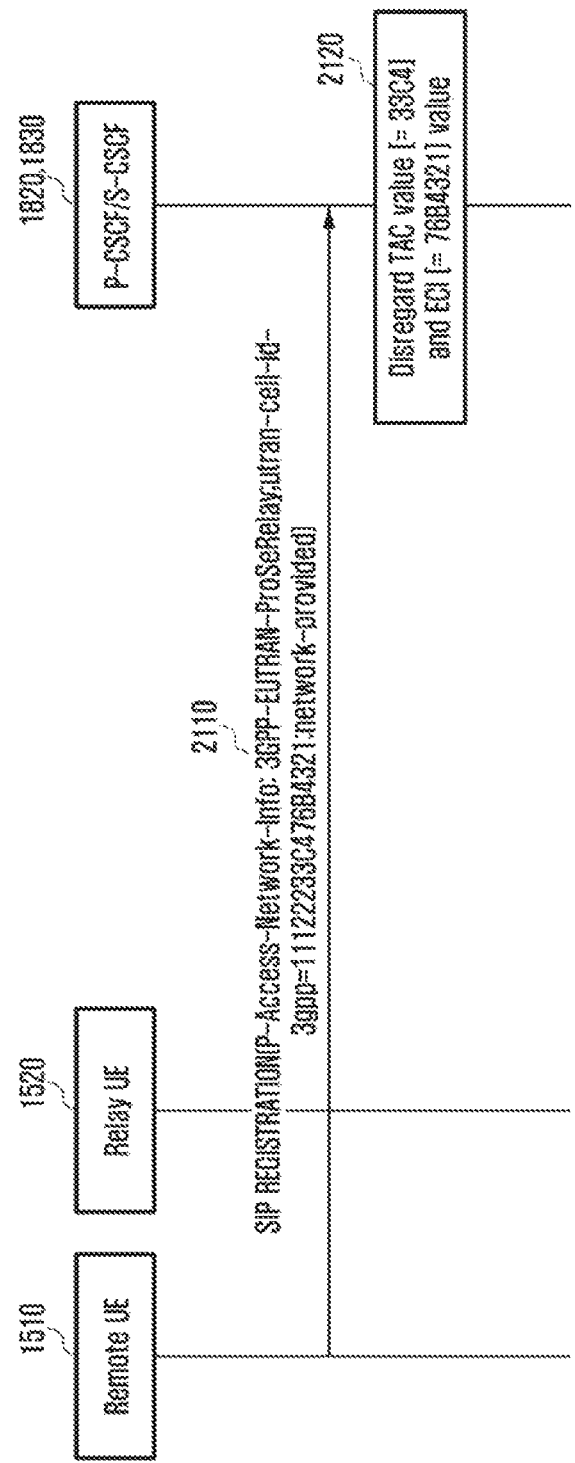
FIG. 21 is a flow chart of providing a dummy value for TAC and ECI to an SIP header.

FIG. 21 is a flow chart of providing a dummy value for TAC and ECI to an SIP header.

Referring to FIG. 21, according to the embodiment of the present invention, the remote UE 1510 may provide a dummy value for the TAC and the ECI to the SIP header.

When the remote UE 1510 transmits the SIP message to the P-CSCF 1820/S-CSCF 1830 for the IMS service in step 2110, the remote UE 1510 sets the access type of the P-Access-Network-Info header field of the SIP header as the 3GPP-EUTRAN-ProSeRelay or the 3GPP-EUTRAN-ProSeUNR to notify the P-CSCF 1820 that it accesses the IMS network through the ProSe relay. For example, it may be put in the header field of the SIP header as follows.

P-Access-Network-Info: 3GPP-EUTRAN-ProSeRelay; utran-cell-id-3gpp=11122233C476B4321; network-provided or P-Access-Network-Info:3GPP-EUTRAN-ProSeUNR; utran-cell-id-3gpp=11122233C476B4321; network-provided.

The first six digits 111222 represent PLMN information, the next four digits 33C4 represent TAC information, and the next seven digits 76B4321 represent ECI information.

Of course, the method for notifying an access to an IMS network through a ProSe relay may also notify the access through the ProSe Relay using the separate field in addition to the access type. The SIP message transferred from the remote UE 1510 includes SIP registration, SIP invite, SIP update, SIP 200OK, etc.

Here, for convenience of explanation, the SIP registration message will be described as an example.

In this case, if the IMS entities such as the P-CSCF 1820 or the S-CSCF 1830 that receive the SIP registration message recognize the access through the ProSe relay from the header information, the IMS entities may consider the TAC information value (33C4 in the drawing) and the ECI information value (76B4321 in the drawing) included in the P-Access-Network-Info header field as a dummy value and disregard the related value.

Figure 22:
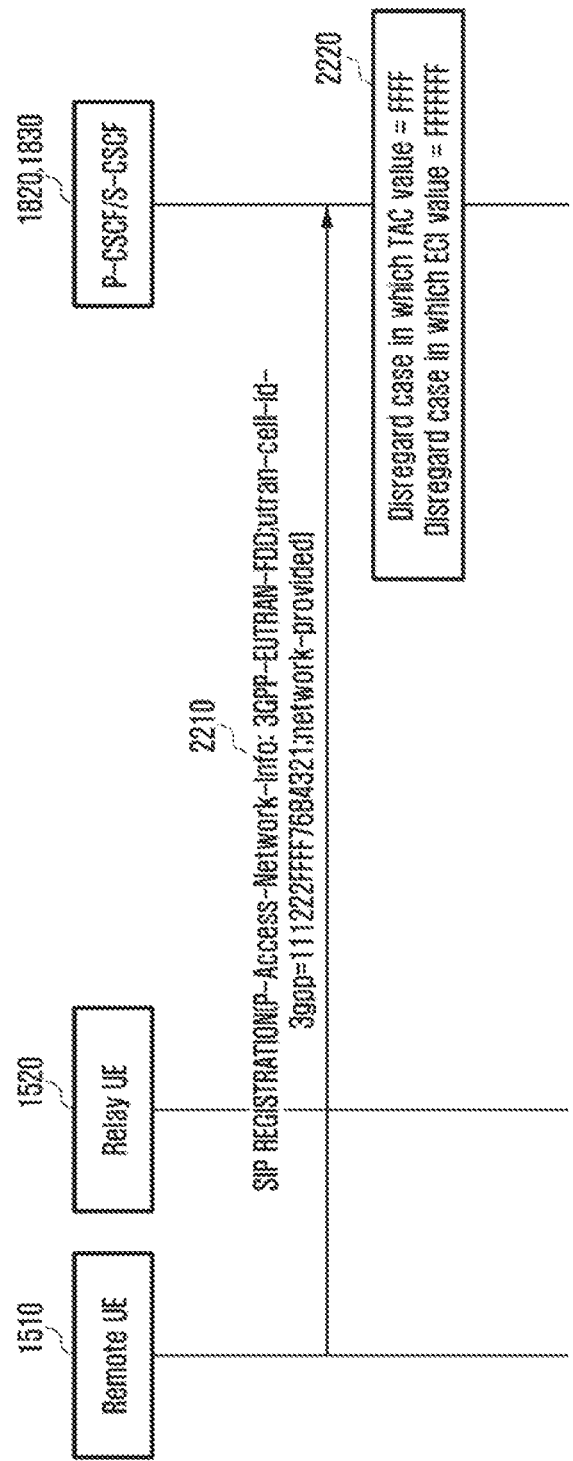
FIG. 22 is another flow chart of providing the dummy value for the TAC and the ECI to the SIP header.

FIG. 22 is another flow chart of providing the dummy value for the TAC and the ECI to the SIP header.

Referring to FIG. 22, according to the embodiment of the present invention, the remote UE 1510 may provide the dummy value for the TAC and the ECI to the SIP header.

When the remote UE 1510 transmits the SIP message to the P-CSCF 1820/S-CSCF 1830 for the IMS service in step 2210, the remote UE 1510 sets the access type of the P-Access-Network-Info header field of the SIP header as a 3GPP-EUTRAN-TDD or a 3GPP-EUTRAN-FDD by the same method as the SIP message through the general EPS network. However, it may be notified that the dummy value is used, by using the pre-defined TAC or pre-defined ECI value previously engaged between the provider and the terminal. For example, the pre-defined TAC=FFF and the pre-defined ECI may be put in the header field as follows.

When the remote UE 1510 does not know only the TAC value, the header field may be as follows.
    P-Access-Network-Info: 3GPP-EUTRAN-ProSeFDD; utran-cell-id-3gpp=111222FFFF76B4321; network-provided.

When the remote UE 1510 does not know both of the TAC value and the ECI value, the header field may be as follows.
    P-Access-Network-Info: 3GPP-EUTRAN-ProSeFDD; utran-cell-id-3gpp=111222FFFFFFFFFFF; network-provided.

The SIP message transmitted from the remote UE 1510 includes SIP registration, SIP invite, SIP update, SIP 200OK, etc.

Here, for convenience of explanation, the SIP registration message will be described as an example.

If the IMS entities such as the P-CSCF 1820 or the S-CSCF 1830 receiving the SIP registration message recognize from the header information that the dummy value is used in step 2220, the corresponding TAC and ECI value included in the P-Access-Network-info header field may be disregarded.

Figure 23:
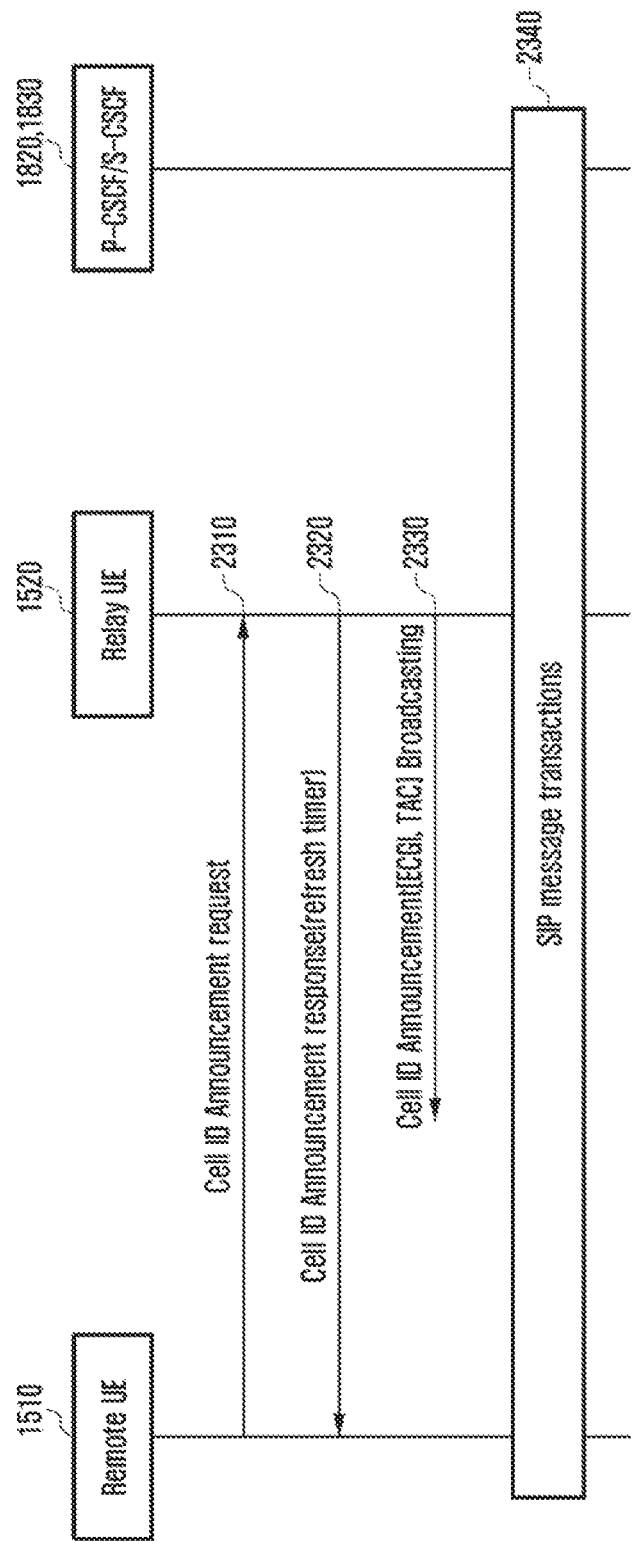
FIG. 23 is a flow chart illustrating an example of a procedure of allowing a remote UE to request a relay UE to acquire ECGI and TAC values.

FIG. 23 is a flow chart illustrating an example of a procedure of allowing a remote UE to request a relay UE to acquire ECGI and TAC values.

Referring to FIG. 23, according to the embodiment of the present invention, the remote UE 1510 may request the relay UE 1520 to acquire the ECGI and TAC values.

In step 2310, the remote UE 1510 may transmit a cell ID announcement request message to the relay UE 1520 to request the cell information. In step 2320, the relay UE 1520 may transmit a refresh timer to the remote UE 1510 along with the cell ID announcement response. Further, in step 2330, when the corresponding refresh timer expires, the relay UE 1520 may broadcast the cell ID announcement. The cell ID announcement message includes the ECGI information as well as the TAC information of the cell that the relay UE 1520 accesses. Therefore, the remote UE 1510 receiving the cell ID announcement message may acquire the PLMN information and the ECI information from the ECGI information of the relay UE received from the relay UE 1520 and use the TAC information of the relay UE 1520 received simultaneously therewith to reflect it to the SIP message header. For example, it may be put in the header field as follows.
    P-Access-Network-Info: 3GPP-EUTRAN-FDD; utran-cell-id-3gpp=11122233C476B4321; network-provided.

The first six digits 111222 represent PLMN information, the next four digits 33C4 represent TAC information, and the next seven digits 76B4321 represent ECI information. Further, in step 2340, the remote UE 1510 may transmit the SIP message to the IMS entities such as the P-CSCF 1820 or the S-CSCF 1830.

Figure 24:
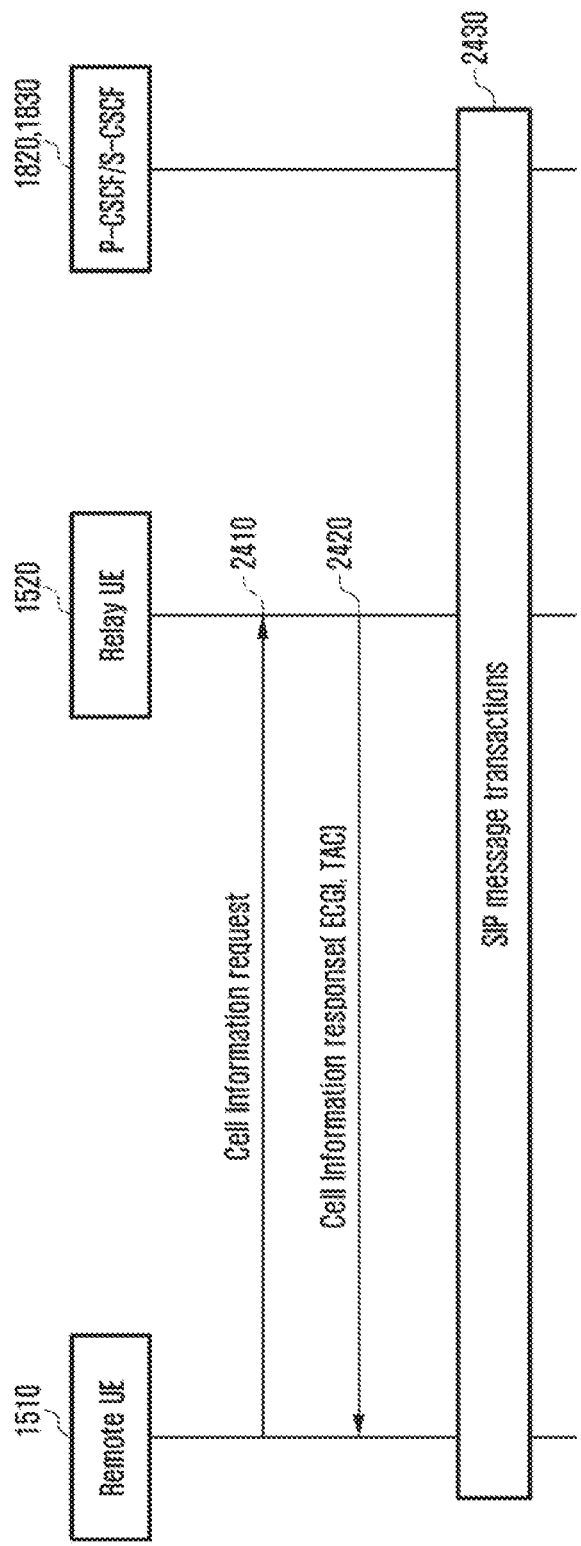
FIG. 24 is a flow chart illustrating another example of the procedure of allowing a remote UE to request a relay UE to acquire ECGI and TAC values.

FIG. 24 is a flow chart illustrating another example of the procedure of allowing a remote UE to request a relay UE to acquire ECGI and TAC values.

Referring to FIG. 24, according to the embodiment of the present invention, the remote UE 1510 may request the relay UE 1520 to acquire the ECGI and TAC values.

In step 2410, the remote UE 1510 may transmit the cell ID announcement request message to the relay UE 1520 to request the cell information whenever it transmits the SIP message. Further, in step 2420, the relay UE 1520 may transmit the cell information response including the ECGI and TAC information of the relay UE 1510.

Therefore, the remote UE 1510 receiving the cell information response may acquire the PLMN information and the ECI information from the ECGI information of the relay UE received from the relay UE 1520 and use the TAC information of the relay UE 1520 received simultaneously therewith to reflect it to the SIP message header. For example, it may be put in the header field as follows.
    P-Access-Network-Info: 3GPP-EUTRAN-FDD; utran-cell-id-3gpp=11122233C476B4321; network-provided.

The first six digits 111222 represent PLMN information, the next four digits 33C4 represent TAC information, and the next seven digits 76B4321 represent ECI information. Further, in step 2430, the remote UE 1510 may transmit the SIP message to the IMS entities such as the P-CSCF 1820 or the S-CSCF 1830.

Figure 25:
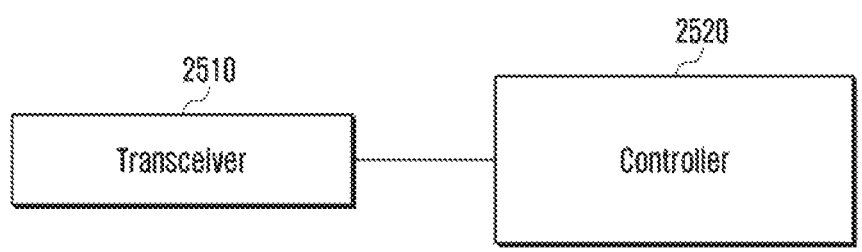
FIG. 25 is a block configuration diagram of a terminal according to an embodiment of the present invention.

FIG. 25 is a block configuration diagram of a terminal according to an embodiment of the present invention.

Referring to FIG. 25, the terminal according to one embodiment of the present invention may include a transceiver 2510 and a controller 2520 controlling the overall operation of the terminal. In this case, the terminal may mean any one of an MCPTT terminal, a CIoT terminal, an LTE and CIoT terminal, a remote terminal, and a relay terminal.

The controller 2520 of the terminal controls the terminal to perform any one operation of the foregoing embodiments. For example, when the terminal is the remote terminal, the controller 2520 of the terminal may perform a control to transmit the TMGI monitoring request message including the Prose per packet priority to the relay terminal and receive the MBMS traffic from the relay terminal depending on the ProSe per packet priority. Alternatively, when the terminal is the relay terminal, the controller 2520 of the terminal may perform a control to receive the TMGI monitoring request message including the Prose per packet priority from the remote terminal and transmit the MBMS traffic to the remote terminal depending on the ProSe per packet priority.

Further, the transceiver 2510 of the terminal may transmit and receive a signal according to any one operation of the foregoing embodiments. For example, when the terminal is the remote terminal, the transceiver 2510 of the terminal may transmit the TMGI monitoring request message including the ProSe per packet priority to the relay terminal and receive the MBMS traffic. Further, when the terminal is the relay terminal, the transceiver 2510 of the terminal may receive the TMGI monitoring request message including the ProSe per packet priority from the remote terminal and transmit the MBMS traffic.

Figure 26:
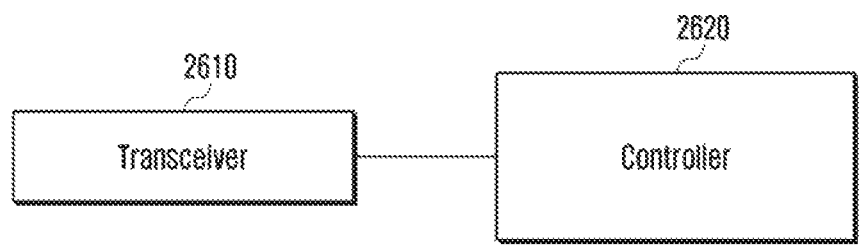
FIG. 26 is a block configuration diagram of network entity according to an embodiment of the present invention.

FIG. 26 is a block configuration diagram of network entity according to an embodiment of the present invention.

Referring to FIG. 25, the network entity according to one embodiment of the present invention may include a transceiver 2610 and a controller 2620 controlling the overall operation of the terminal. In this case, as long as the network entity is network entities for describing the embodiment of the present invention such as the base station, the MME, the PreSe function, the MCPTT application server, the P-CSCF, the HSS, the GW, the MSSC, and the MCE, any network entity may correspond thereto.

The controller 2620 of the network entity controls the network entity to perform any one operation of the foregoing embodiments. For example, when the network entity is the GCS AS, the controller 2620 of the network entity may perform a control to receive the ECGI list from the terminal. Alternatively, when the network entity is the ProSe function, the controller 2620 of the network entity may perform a control to receive the service authorization request message from the remote terminal.

Further, the transceiver 2610 of the network entity may transmit and receive a signal according to any one operation of the foregoing embodiments. For example, when the network entity is the GCS AS, the transceiver 2610 of the network entity may receive the ECGI list from the terminal. Alternatively, when the network entity is the ProSe function, the transceiver 2610 of the network entity may receive the service authorization request message from the remote terminal.

The embodiments of the present invention disclosed in the present specification and the accompanying drawings have been provided to easily describe and assist in understanding the described content and do not limit the scope of the present invention. It is obvious to those skilled in the art to which the present invention pertains that various modifications may be made without departing from the scope of the present invention, in addition to the embodiments disclosed herein.

Meanwhile, although the exemplary embodiments of the present invention have been illustrated in the present specification and the accompanying drawings and specific terms have been used, they are used in a general meaning in order to assist in the understanding the present invention and do not limit the scope of the present invention. It is obvious to those skilled in the art to which the present invention pertains that various modifications may be made without departing from the scope of the present invention, in addition to the exemplary embodiments disclosed herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a remote terminal for supporting a service in a wireless communication system, the method comprising:
    transmitting, to a relay terminal, a request message comprising a temporary mobile group identity (TMGI) and a proximity based service (ProSe) per-packet priority associated with the TMGI;
    receiving, from the relay terminal, a response message comprising a ProSe layer2 group identifier for identifying a group for receiving a MBMS traffic corresponding to the TMGI; and
    receiving, from the relay terminal, the MBMS traffic associated with the ProSe layer2 group identifier,
    wherein the response message comprises a TMGI monitoring response message, and
    wherein the MBMS traffic is transmitted based on the ProSe per-packet priority by the relay terminal.

2. The method of claim 1,
    wherein the request message comprises a TMGI monitoring request message, and
    wherein the request message further comprises a multimedia broadcast multicast service (MBMS) service area identity (SAI).

3. The method of claim 1,
    wherein the ProSe per-packet priority is obtained from an application layer in the remote terminal.

4. The method of claim 1,
    wherein the MBMS traffic is received over a PC5 interface.

5. A method of a relay terminal for supporting a service in a wireless communication system, the method comprising:
    receiving, from a remote terminal, a request message comprising a temporary mobile group identity (TMGI) and a proximity based service (ProSe) per-packet priority associated with the TMGI;
    transmitting, to the remote terminal, a response message comprising a ProSe layer2 group identifier for identifying a group for transmitting a MBMS traffic corresponding to the TMGI; and
    transmitting, to the remote terminal, the MBMS traffic associated with the ProSe layer2 group identifier based on the ProSe per-packet priority,
    wherein the response message comprises a TMGI monitoring response message, and
    wherein the MBMS traffic is transmitted based on the ProSe per-packet priority by the relay terminal.

6. The method of claim 5,
    wherein the request message comprises a TMGI monitoring request message, and
    wherein the request message further comprises a multimedia broadcast multicast service (MBMS) service area identity (SAI).

7. The method of claim 5,
    wherein the ProSe per-packet priority is obtained from an application layer in the remote terminal.

8. The method of claim 6,
    wherein the MBMS traffic is transmitted over a PC5 interface.

9. A remote terminal comprising:
    a transceiver; and
    a controller coupled with the transceiver and configured to transmit, to a relay terminal, a request message comprising a temporary mobile group identity (TMGI) and a proximity based service (ProSe) per-packet priority associated with the TMGI,
    receive, from the relay terminal, a response message comprising a ProSe layer2 group identifier for identifying a group for receiving a MBMS traffic corresponding to the TMGI, and receive, from the relay terminal, the MBMS traffic associated with the ProSe layer2 group identifier
    wherein the response message comprises a TMGI monitoring response message, and
    wherein the MBMS traffic is transmitted based on the ProSe per-packet priority by the relay terminal.

10. The remote terminal of claim 9, wherein the request message comprises a TMGI monitoring request message, and wherein the request message further comprises a multimedia broadcast multicast service (MBMS) service area identity (SAI).

11. The remote terminal of claim 9, wherein the controller is configured to obtain the ProSe per-packet priority from an application layer in the remote terminal.

12. The remote terminal of claim 11, wherein the controller is configured to receive the MBMS traffic over a PC5 interface.

13. A relay terminal comprising:

a transceiver; and a controller coupled with the transceiver and configured to receive, from a remote terminal, a request message comprising a temporary mobile group identity (TMGI) and a proximity based service (ProSe) per-packet priority associated with the TMGI, transmit, to the remote terminal, a response message comprising a ProSe layer2 group identifier for identifying a group for transmitting a MBMS traffic corresponding to the TMGI, and transmit, to the remote terminal, the MBMS traffic associated with the ProSe layer2 group identifier based on the ProSe per-packet priority wherein the response message comprises a TMGI monitoring response message, and wherein the MBMS traffic is transmitted based on the ProSe per-packet priority by the relay terminal.

14. The relay terminal of claim 13, wherein the request message comprises a TMGI monitoring request message, and wherein the request message further comprises a multimedia broadcast multicast service (MBMS) service area identity (SAI).

15. The relay terminal of claim 13, wherein the ProSe per-packet priority is obtained from an application layer in the remote terminal.

16. The relay terminal of claim 13, wherein the controller is configured to transmit the MBMS traffic over a PC5 interface.

* * * * *